United States Patent
Olsen et al.

(10) Patent No.: US 9,836,134 B1
(45) Date of Patent: Dec. 5, 2017

(54) TOUCHSCREEN INPUT DEVICE BASED CONTENT SHARING

(71) Applicant: Amazon Technologies, Inc., Reno, NV (US)

(72) Inventors: Erik Jacob Olsen, Bellevue, WA (US); Robert Duane Rost, Seattle, WA (US); Brett Ethan Johnson, Woodinville, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/161,353

(22) Filed: Jan. 22, 2014

(51) Int. Cl.
*G06F 3/041* (2006.01)
*G06F 3/0354* (2013.01)

(52) U.S. Cl.
CPC .......... *G06F 3/03545* (2013.01); *G06F 3/041* (2013.01)

(58) Field of Classification Search
CPC ... G09B 7/00; G09B 7/02; G09B 5/00; G09B 5/14; G09B 7/04; G09B 15/023; G06F 3/03545; G06F 3/038; G06F 3/0486; G06F 3/0488; G06F 17/241; G06F 3/012; G06F 3/013; G06F 3/0308; G06F 3/0346; G06F 3/0412; G06F 3/045; G06F 3/04815; G06F 3/0317; G06F 3/044; G06F 3/046; G06F 3/04883; G06F 3/0416; G06F 2203/04106; G06F 3/014; G06F 3/0321; G06F 3/033; G06F 9/4443; G06F 2203/0384; G06F 21/608; G06F 2221/2153; G06F 3/03546; G06F 3/0386; G06F 3/1204; G06F 3/1265; G06F 3/1284; G06F 17/30643; G06F 17/30867; G06F 21/60; G06F 21/10; G06F 3/017; G06F 2221/2117; G06F 11/1402; G06F 17/30902; G06F 21/121; G06F 21/128; G06F 21/6272; G06F 17/2252; G06F 21/31; G06F 21/604; G06F 21/6218; G06F 2221/2141; G06F 3/041; G06F 2221/2113; G06F 3/0383; G06F 3/03542; G06Q 20/20; G06Q 20/325; G06Q 30/0267
USPC ................. 345/156, 169, 173–181
See application file for complete search history.

(56) References Cited

U.S. PATENT DOCUMENTS

| 5,453,762 A * | 9/1995 | Ito et al. ................. 345/179 |
| 2010/0079414 A1* | 4/2010 | Ferlitsch ................. 345/179 |
| 2012/0202527 A1* | 8/2012 | Obradovich et al. ...... 455/456.3 |
| 2013/0254843 A1* | 9/2013 | Dagaeff ................. G06F 21/31 726/3 |

* cited by examiner

*Primary Examiner* — Duc Dinh
(74) *Attorney, Agent, or Firm* — Baker & Hostetler LLP

(57) ABSTRACT

A user can use a stylus to share content between the user's account and second user's account. When the user uses the stylus with a computing device, the stylus can send an identifier to the computing device. The user can also select to share content from the user's account with the second user's account. The computing device can send the identifier of the stylus and a request to share the content with the second user's account to a server that hosts the accounts. The server can associate the content with the second user's account. The server can send the content to the second user's computing device.

22 Claims, 18 Drawing Sheets

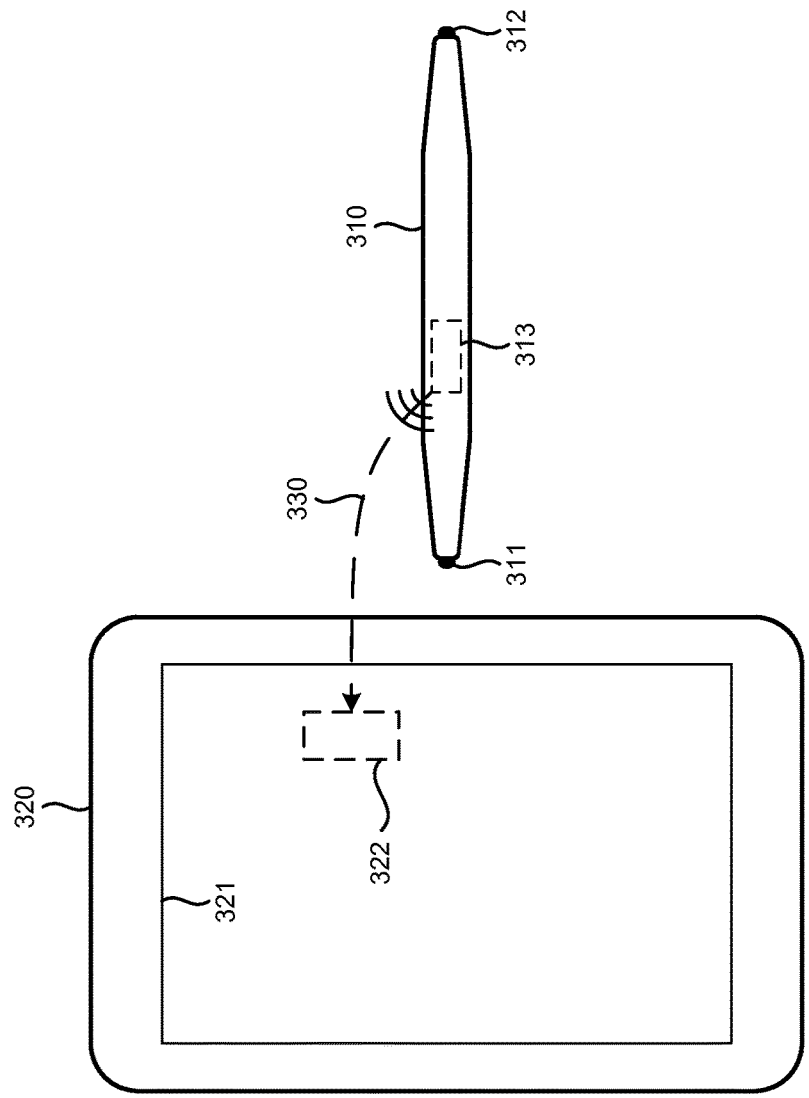

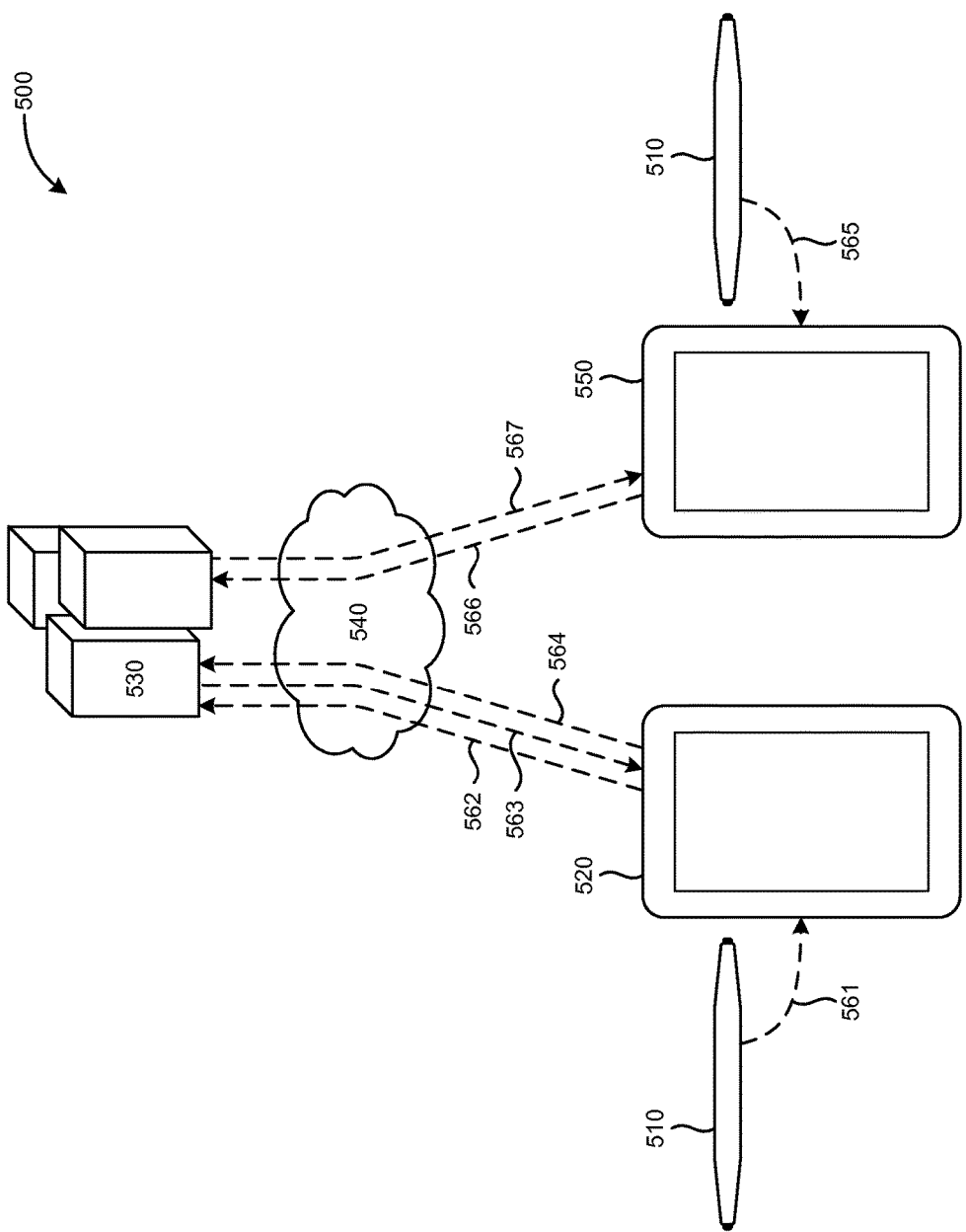

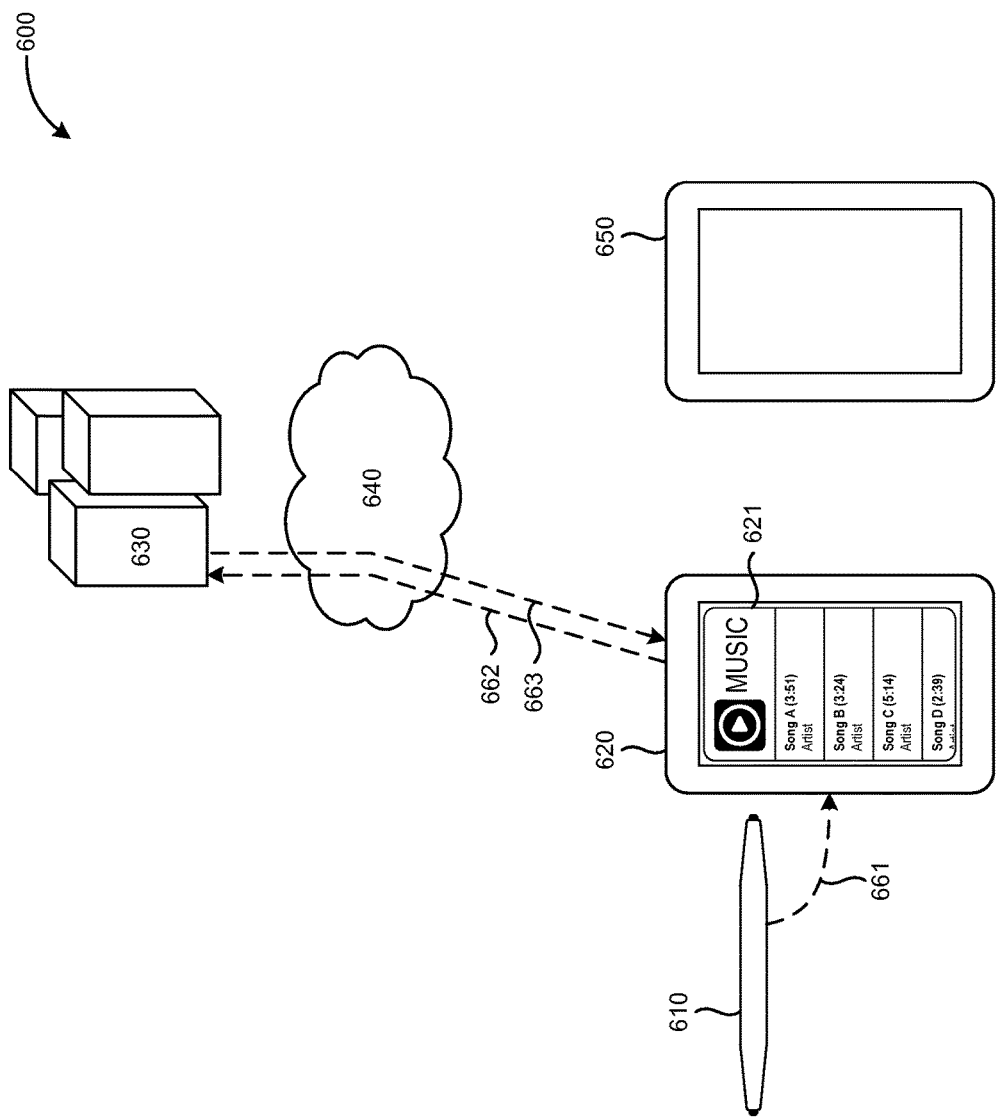

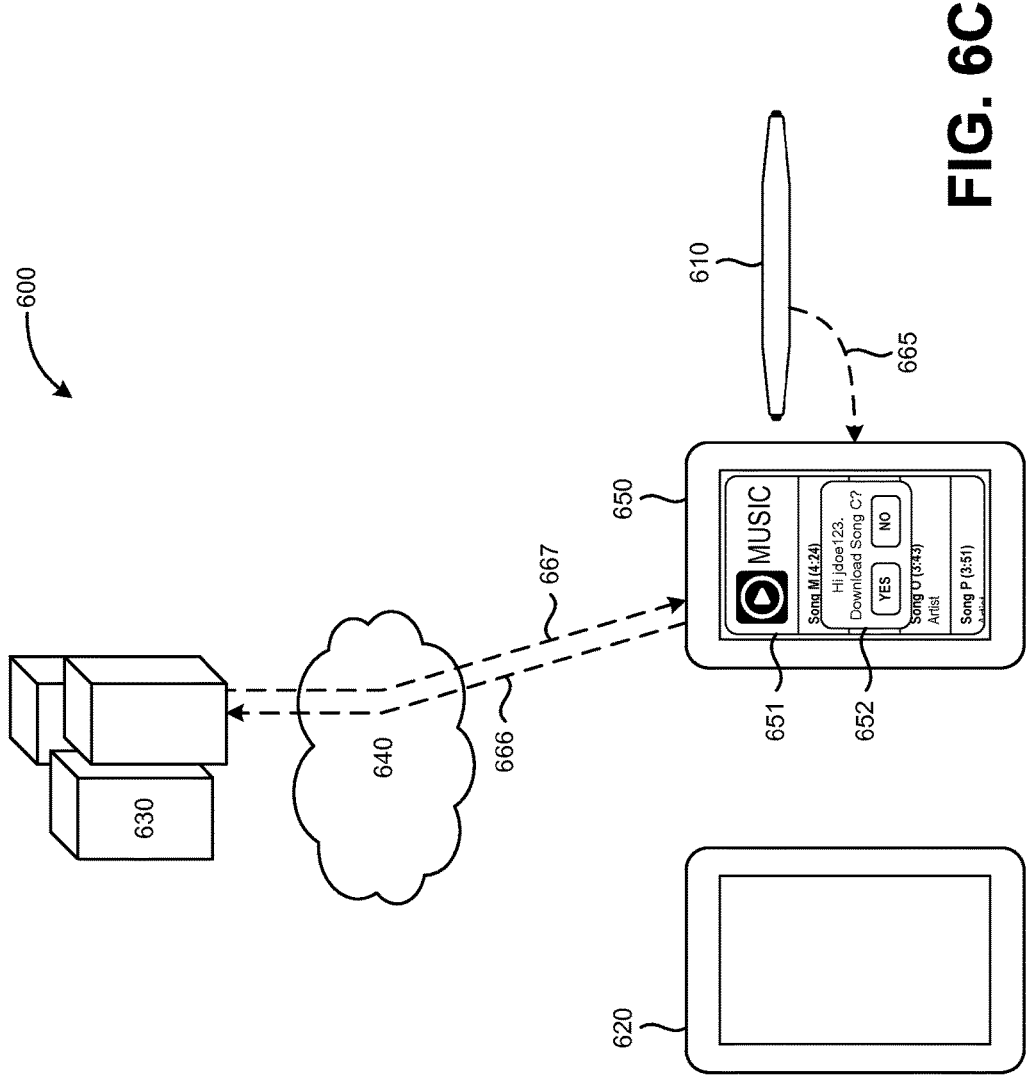

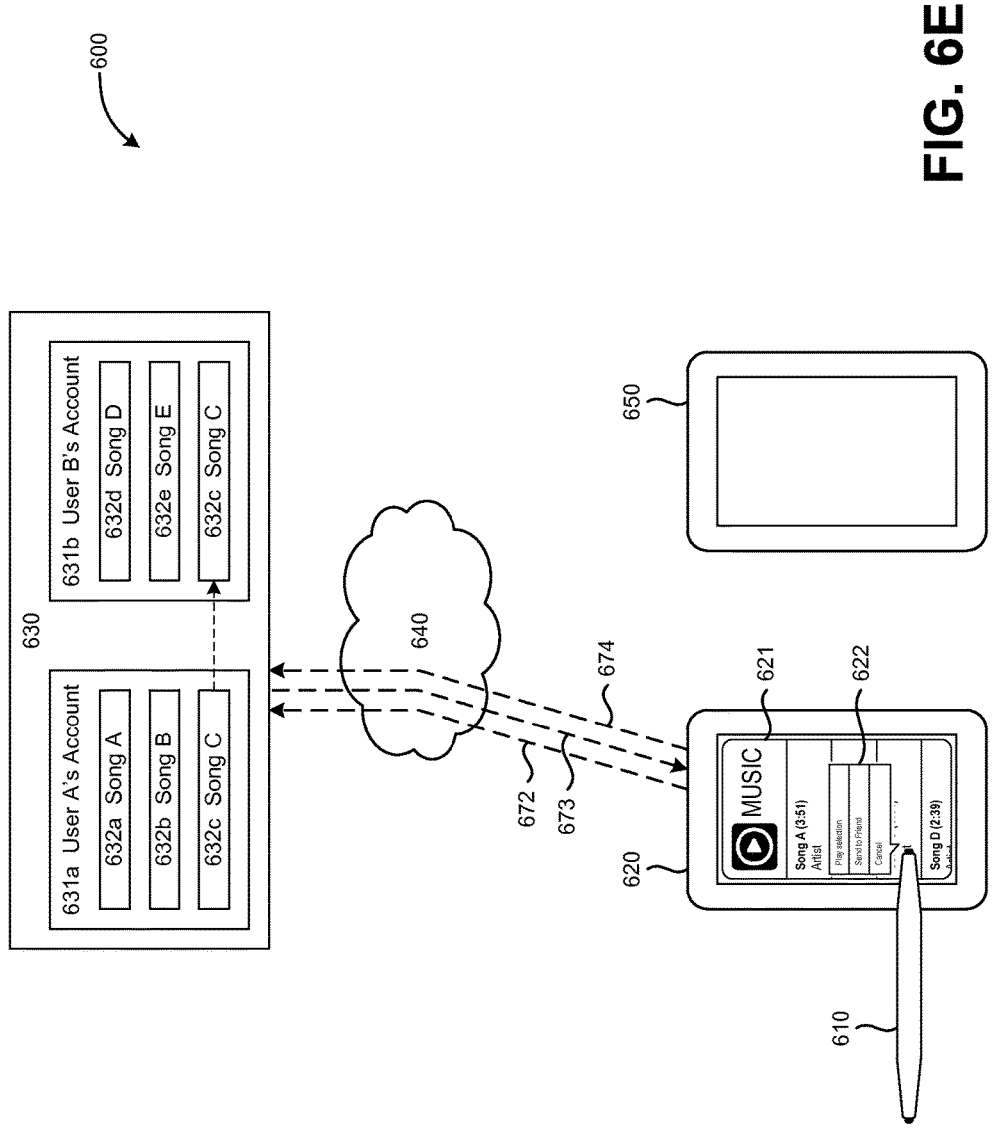

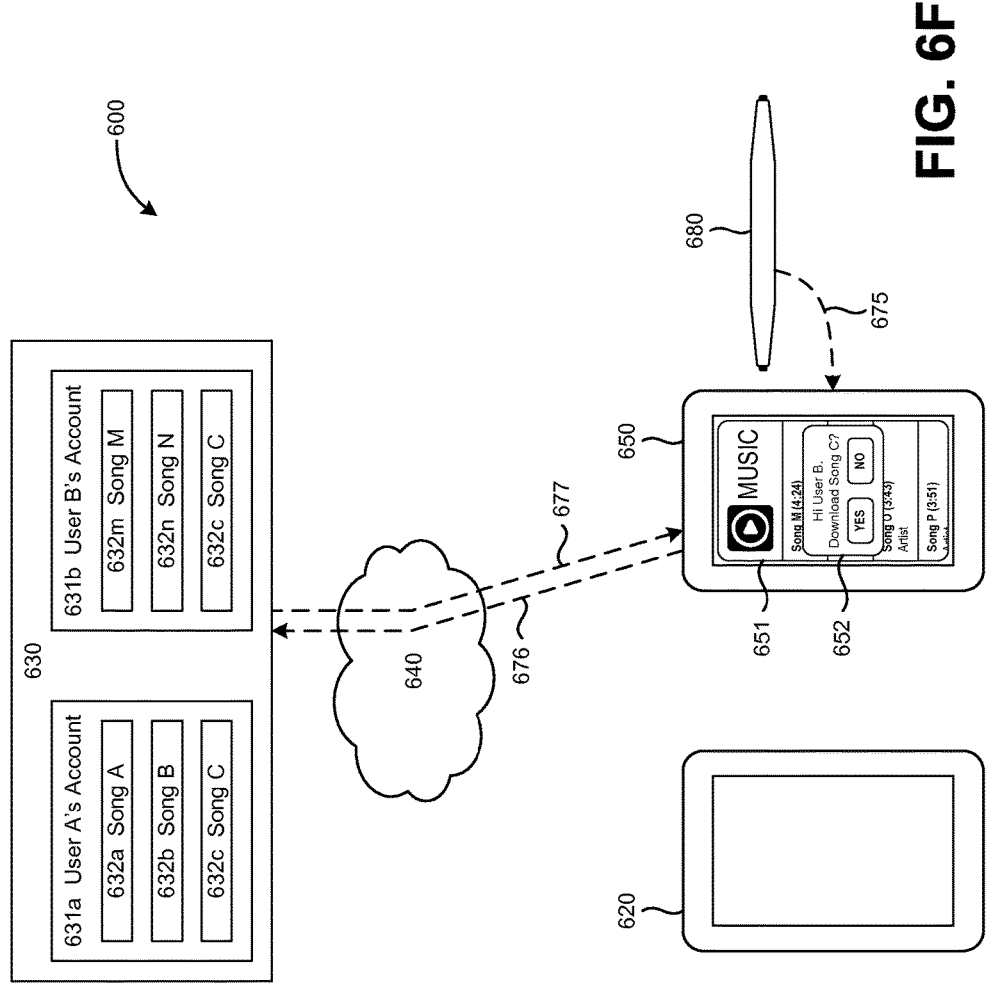

TOUCHSCREEN INPUT DEVICE BASED CONTENT SHARING

CROSS REFERENCE TO RELATED APPLICATIONS

This application is related to United States patent application Ser. No. 14/161,314 filed Jan. 22, 2014, entitled "TOUCHSCREEN INPUT DEVICE WITH IDENTIFIER", and to U.S. patent application Ser. No. 14/161,374 filed Jan. 22, 2014, entitled "STYLUS BASED PROFILE MANAGEMENT", the contents of which are hereby incorporated by reference in their entirety.

BACKGROUND

Touchscreen displays (or touchscreens) are visual displays that allow user interaction with the displayed image by touching the screen. Touchscreens can sense one or more touches at any given time and interpret the touches as a user input. Touches of a touchscreen can include any number of gestures, such as a point touch, a swipe, a pinch and the like. The different gestures can be interpreted as different user inputs, such as a point touch to make a selection, a swipe to scroll, a pinch to zoom and the like. Touchscreens can provide users with the convenience of not needing large input devices, such as a mouse, a keyboard and the like, to provide inputs to a user device.

Touchscreens are increasingly common in many computing devices, such as tablet computers, cell phones, gaming machines, laptop computers, GPS devices, car entertainment systems and the like. Many of these devices can be communicatively connected to communication networks, such as WiFi networks, cellular data networks and the like. Such devices can allow for convenient user input via a touchscreen while providing access to many computing resources accessible via a communication network.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

FIG. 3 depicts an embodiment of a touchscreen input device that can communicate an identifier of the touchscreen input device to a computing device.

FIG. 5 depicts an example of a system that includes a touchscreen input device, a first computing device, one or more servers, a network and a second computing device.

FIGS. 6A, 6B and 6C depict various instances of a system that can be used to transfer content from a first computing device to a second computing device.

FIGS. 6D, 6E and 6F depict how a system can be used to transfer content from a first user account to a second user account.

DETAILED DESCRIPTION

There are many types of touchscreens. Capacitive touchscreens include an insulating layer with a conductive coating. Touching the conducting coating with an electrical conductor distorts the conductive coating's electrostatic field, which can be measured as a change in capacitance. The electrical conductor used to touch the capacitive touchscreen can include a human finger, a capacitive tip of a stylus or any other electrical conductor. Many hand gloves are made of insulating material and prevent a gloved finger from being able to interact with touchscreen devices. However, some gloves have been developed that can allow a gloved finger to interact with a touchscreen devices, such as by weaving conductive material into the glove.

Projected capacitance touchscreens have a matrix of conductive material layered on insulating layers. Voltage is applied to the matrix to create a uniform electrostatic field. When a conductive object comes in contact with the projected capacitance touchscreen, the uniform electrostatic field is disrupted and a change in the capacitance at points along the matrix can be measured. The electrical conductor used to touch the projected capacitance touchscreen can include a human finger, a capacitive tip of a stylus or any other electrical conductor.

Resistive touchscreens include two layers of electrically resistive material that are separated from each other by a space. When one layer is depressed, the resistance between the two layers can decrease so that a voltage difference across each of the layers can be measured. Any object, such as a human finger, a gloved human finger, a tip of a stylus or any other object, can be used to depress one of the layers of a resistive touchscreen.

Many other touchscreens exist, such as infrared grid touchscreens, infrared acrylic projection touchscreens, optical imaging touchscreens, dispersive signal technology touchscreens and acoustic pulse recognition touchscreens. Regardless of the type of touchscreen used, a user can interact with the touchscreen using a touchscreen input device. A touchscreen input device is a device that includes an end that can be used to interact with a touchscreen. The end can include a capacitive tip, an electrical conductor on the tip and the like. One example of a touchscreen input device is a stylus.

Figure 1:
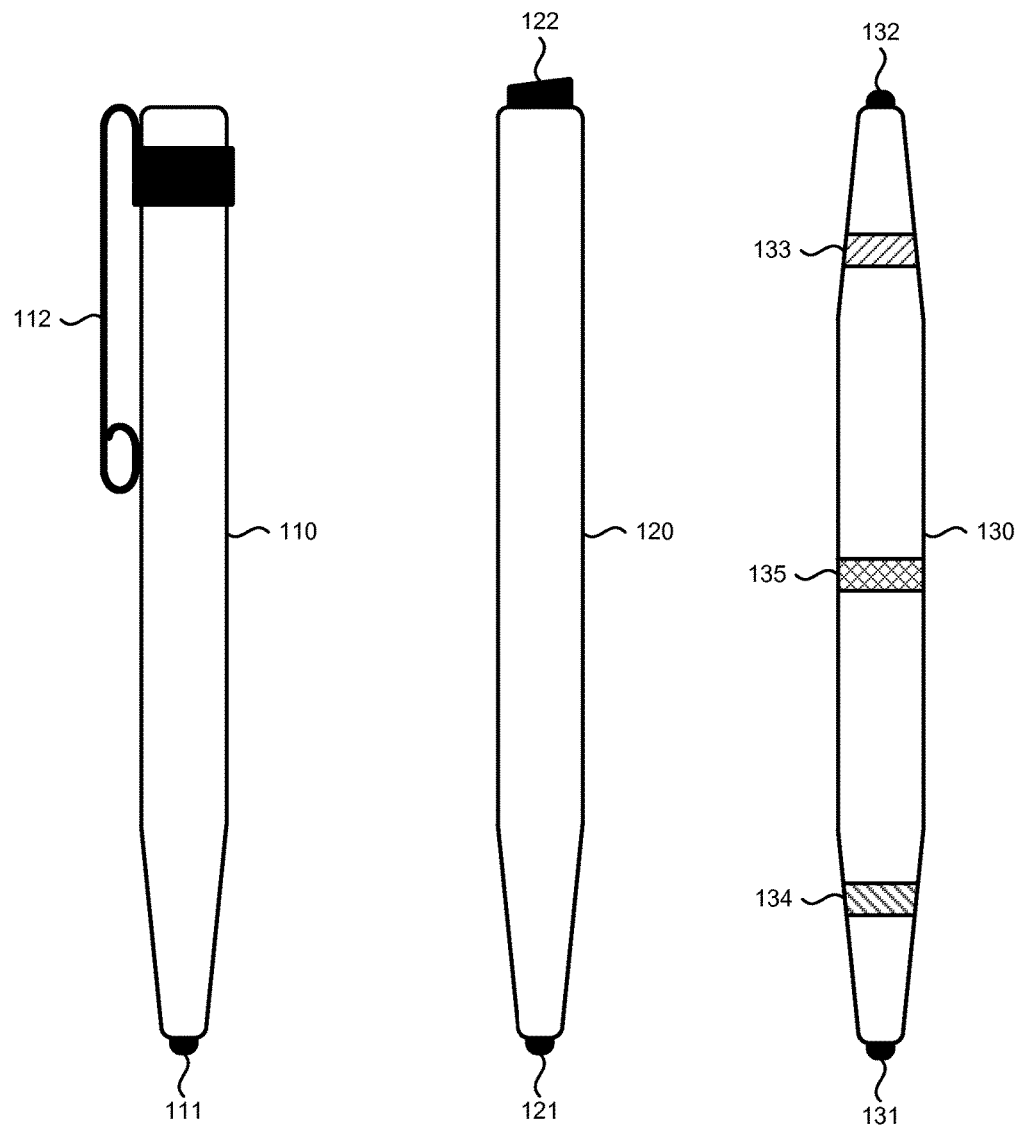
FIG. 1 depicts examples of styli that can be used to provide inputs into touchscreen devices.

FIG. 1 depicts examples of styli that can be used to provide inputs into touchscreen devices. Stylus 110 is a single-end stylus with one capacitive end 111. Stylus 110 is in the form of a pen and includes a clip 112. When the capacitive end 111 is brought close to or in contact with a touchscreen, the touchscreen can interpret the motion of the capacitive end 111 as a touch of the touchscreen. Stylus 120 is a dual-end stylus with a first capacitive end 121 and a second capacitive end 122. In the case of stylus 120, the first capacitive end 121 is smaller, like the tip of a pen or pencil, and may be referred to as the tip end of stylus 120. The second capacitive end is larger, like the eraser of a pencil, and may be referred to as the eraser end of stylus 120. Stylus 130 is another dual-end stylus with a first capacitive end 131 and a second capacitive end 132. In the case of stylus 130, the first capacitive end 131 and second capacitive end 132 are approximately the same size and the stylus 130 itself is approximately symmetrical. Possible uses of the two ends of a dual-end stylus are described in more detail below.

A stylus can also include any number of other features. For example, a stylus can have features that can aid a computing device in determining an orientation of the stylus with respect to the device. For example, the stylus 130 includes a first color region 133 and a second color region 134. These color regions 133 and 134 are shown as striped, but could also be dots or any other shape. The color regions 133 and 134 can be different colors so that a camera or other light-sensing component on a computing device can determine which end of the stylus 130 is closest to the computing device. The stylus 130 could also include a third color region 135 (or any number of other color regions) to aid in determining the orientation of the stylus 130 with respect to the computing device. Having more than two color regions may help determine orientation in the case where one of the color regions is obscured, such as being obscured by the user's hand. In another example, different ends of the stylus can emit light, or other electromagnetic radiation, at different wavelengths. In this example, a stylus may emit red light from one end and blue light from the other end and the computing device may be able to determine the color of light emitted from the end closest to the computing device. Similar examples are possible with non-visible electromagnetic radiation, such as infrared or ultraviolet electromagnetic radiation. In yet another example, a stylus can include reflective portions that reflect light or other electromagnetic radiation emitted by a computing device Other features of a stylus can include magnetic ends that can be detected by a computing device, buttons that allow for additional user inputs, microphones that can record sound, speakers that can play sounds, haptic elements that can respond to user interactions, lasers that can emit light in a particular direction or any other similar feature. Some features of such a stylus may require power and the stylus can include a battery or other power source. In one example, a battery in a stylus can be charged inductively from a computing device that is in proximity with the stylus so that the stylus recharges as it is used to provide inputs to a computing device.

Figure 2A:
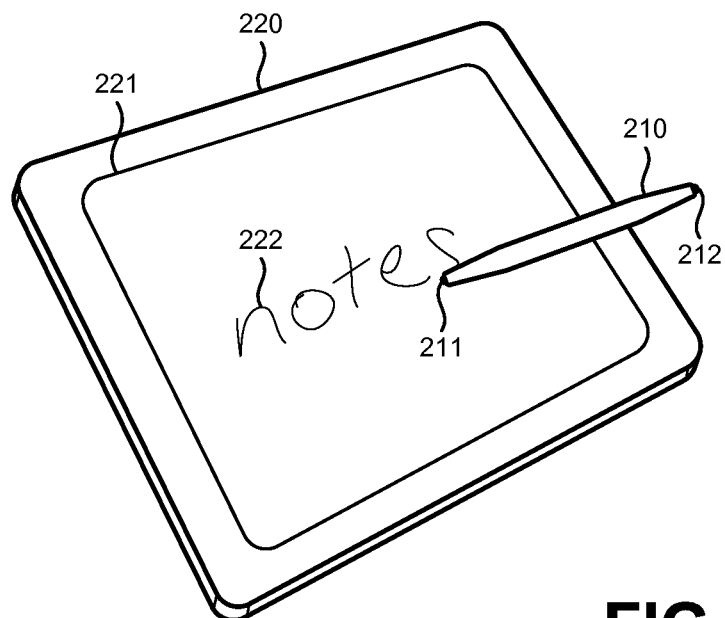
FIGS. 2A and 2B depict instances of a stylus being used with a computing device.
Figure 2B:
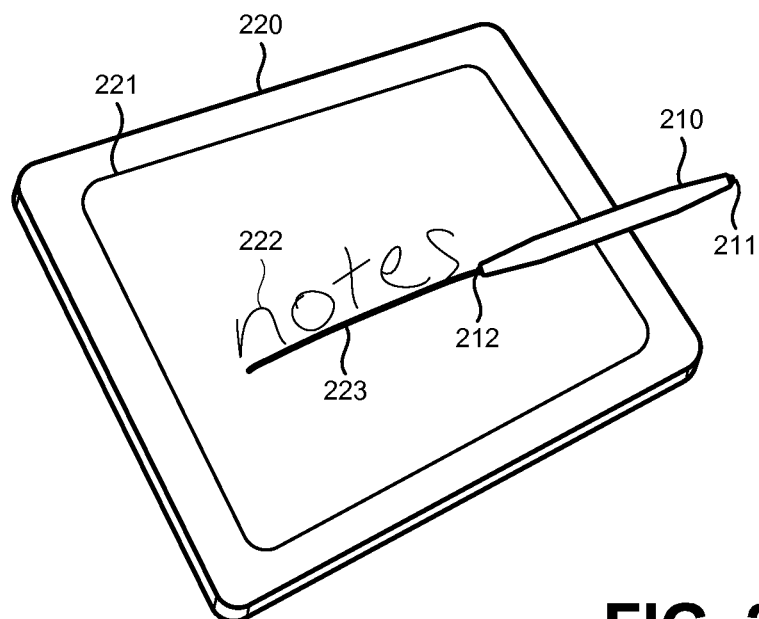

FIGS. 2A and 2B depict instances of a stylus 210 being used with a computing device 220. In the particular instances shown, stylus 210 is a dual-end stylus with a first capacitive end 211 and a second capacitive end 212, and computing device 220 is a tablet with a touchscreen 221. In the instance shown in FIG. 2A, the first capacitive end 211 of the stylus 210 is used to input letters 222 into the touchscreen 221. To make the letters 222, the user can press the first capacitive end 211 of the stylus 210 into the touchscreen 221 and then drag the first capacitive end 211 of the stylus 210 across the touchscreen 221. In the instance shown in FIG. 2B, the second capacitive end 212 of the stylus 210 is used to input a line 223 into the touchscreen 221. To make the line 223, the user can press the second capacitive end 212 of the stylus 210 into the touchscreen 221 and then drag the second capacitive end 212 of the stylus 210 across the touchscreen 221.

In the embodiment shown in FIGS. 2A and 2B, the lines on the touchscreen 221 for the letters 222 are thinner than the line 223 on the touchscreen 221. This difference may be due to the use of different ends of the stylus 210 with the touchscreen 221. The one of the first and second capacitive ends 211 and 212 that is used to touch touchscreen 221 can be determined in a number of ways. In one example, the computing device 220 may be able to determine an orientation of the stylus 210. The computing device 220 can include a camera of the computing device 220 that can take an image of the stylus 210 during operation and processing the image to determine which of the first and second capacitive ends 211 and 212 is used to touch touchscreen 221. In another example, the stylus 210 may include a characteristic, such as a magnet near one of the first and second capacitive ends 211 and 212, that can be detected by the computing device 220 to determine which of the first and second capacitive ends 211 and 212 is used to touch touchscreen 221. In another example, the stylus 210 can include one or more sensors, such as a gyroscope, an accelerometer and the like, that can be used to determine orientation of the first and second capacitive ends 211 and 212 with respect to the computing device 220, and the stylus 210 can send an indication of the orientation to the computing device 220 via a wireless communication link, such as a Bluetooth® communication link, a near field communication (NFC) link, a WiFi communication link and the like. In yet another example, the first and second capacitive ends 211 and 212 may have different sizes (such as in the case of the first and second capacitive ends 121 and 122 of stylus 120 in FIG. 1). The touchscreen 221 may be able to sense the different sizes of the first and second capacitive ends 211 and 212 to determine which of the first and second capacitive ends 211 and 212 is used to touch touchscreen 221. Any number of other ways could be used to determine which of the first and second capacitive ends 211 and 212 is used to touch touchscreen 221. The computing device 220 can interpret the uses of the first and second capacitive ends 211 and 212 as different types of user inputs, such as the thin lines of letters 222 and the thick line 223.

While FIGS. 2A and 2B depict user inputs in the form of letters 222 and a line 223, many other user inputs are possible. A stylus can be used to select a group of items, such as files, songs and the like. A stylus can be used to make selections, such as selecting a particular file or song, selecting an option from a list of options and the like. In one example, the first capacitive end 211 of stylus 210 can be used to copy text and/or files, and the second capacitive end 212 of stylus 210 can be used to paste the copies text and/or files. In another example, the first capacitive end 211 of stylus 210 can be used to input information, such as text, lines and the like, and the second capacitive end 212 of stylus 210 can be used to navigate, such as by scrolling, zooming and the like.

FIG. 3 depicts an embodiment of a touchscreen input device 310 that can communicate an identifier of the touchscreen input device 310 to a computing device 320. The touchscreen input device 310 is in the form of a dual-end stylus with a first capacitive end 311 and a second capacitive end 312. The touchscreen input device 310 also includes a wireless communication device 313. The wireless communication device 313 can be a Bluetooth® transceiver, a WiFi transceiver, an NFC transceiver or transmitter, a radio frequency identification (RFID) transceiver or transmitter or any other type of wireless communication device. In some embodiments, such as in the case of a Bluetooth® transceiver or a WiFi transceiver, the wireless communication device 313 may be a powered device that received power from a battery or other power source in touchscreen input device 310. In such a case, the power source in touchscreen input device 310 can be an inductively chargeable power source that is charged via an indication field generated by the computing device 320. In other embodiments, the wireless communication device 313 may be a passive device, such as an NFC transmitter or an RFID transmitter, that does not require a power source on the touchscreen input device 310.

The computing device 320 includes a touchscreen 321 and a wireless communication device 322. The first and second capacitive ends 311 and 312 of the touchscreen input device 310 can be used to provide inputs to the touchscreen 321. Wireless communication device 322 can be a Bluetooth® transceiver, a WiFi transceiver, an NFC transceiver or receiver, a radio frequency identification (RFID) transceiver or receiver, or any other type of wireless communication device. The wireless communication device 313 of the touchscreen input device 310 can send a wireless signal 330 to the wireless communication device 322. The wireless signal 330 can carry an identifier of the touchscreen input device 310 to the computing device 320. The touchscreen input device 310 can be operable to send the wireless signal 330 at particular times, such as when the touchscreen input device 310 is brought into proximity with the computing device 320, when one of the first and second capacitive ends 311 or 312 of the touchscreen input device 310 is brought into contact with the touchscreen 321 of the computing device 320 and the like.

Figure 4:
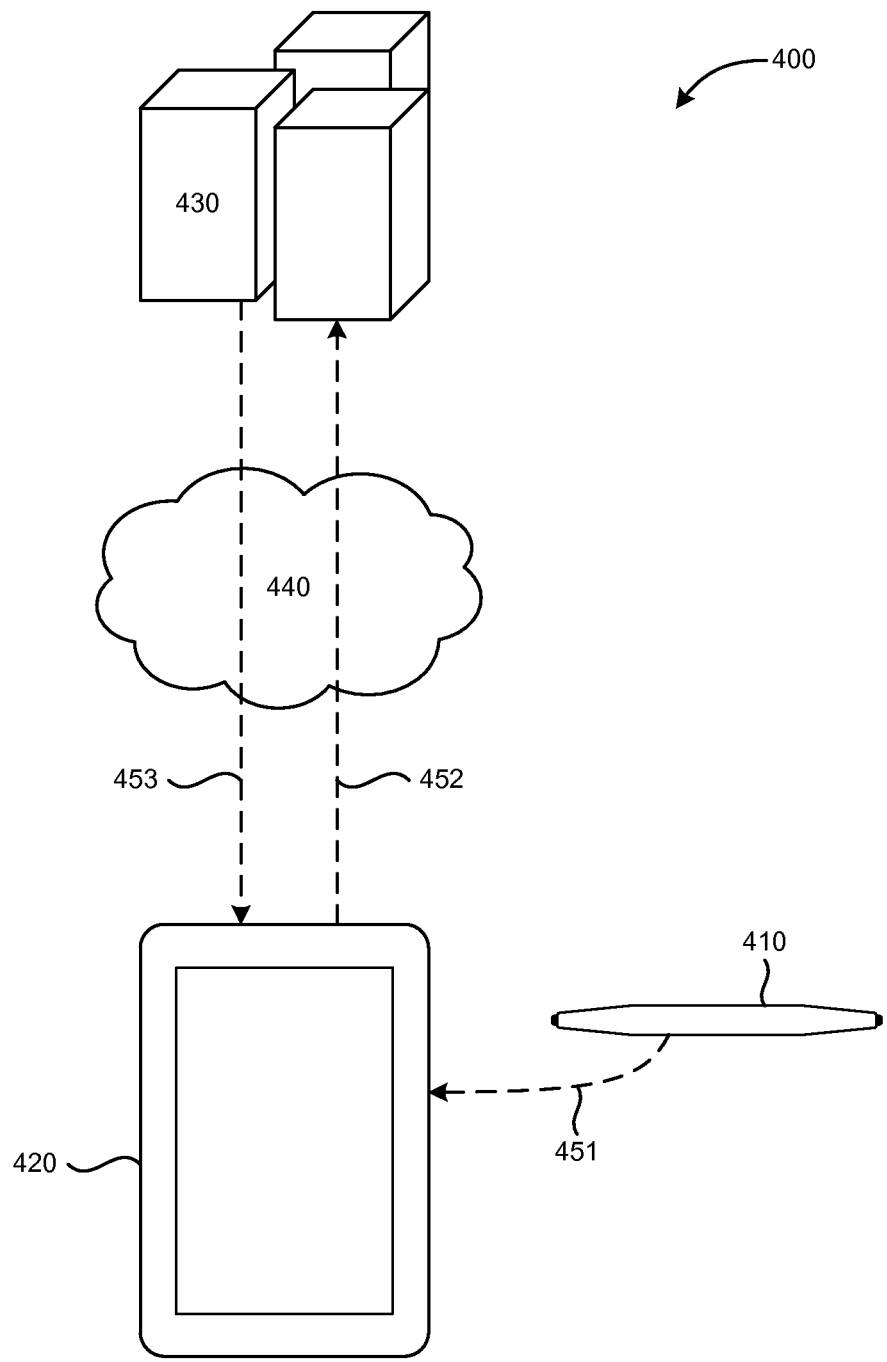
FIG. 4 depicts a system that includes a touchscreen input device, a computing device, one or more servers and a network.

FIG. 4 depicts a system 400 that includes a touchscreen input device 410, a computing device 420, one or more servers 430 and a network 440. The touchscreen input device 410 can send a wireless signal 451 to the computing device 420. The wireless signals 451 can be a Bluetooth® signal, a WiFi signal, an NFC signal, an RFID signal, or any other type of wireless signal. The wireless signal 451 can carry an identifier of the touchscreen input device 410 to the computing device 420. The computing device 420 may have configuration information associated with the identifier of the touchscreen input device 410. The configuration information can be associated with or defined by a particular user of the touchscreen input device 410. For example, the computing device 420 can include particular settings that can be set when the computing device 420 receives the identifier of the touchscreen input device 410. If those settings had been defined by a user of the touchscreen input device 410, the user can have those settings set merely by the computing device 420 recognizing the identifier of the user's touchscreen input device 410. In another example, the computing device 420 can make available for use any content (e.g., audio content, video content, applications, etc.) that is owned by a user of the touchscreen input device 410 when the computing device 420 receives the identifier of the touchscreen input device 410. This scenario would allow a user to have the user's owned content available on the computing device 420 merely by using the user's touchscreen input device 410 with the computing device 420. Other types of configuration information can be used by computing device 420 when the computing device 420 receives the identifier of the touchscreen input device 410.

After receiving the wireless signal 451 with the identifier of the touchscreen input device 410, the computing device 420 can send a signal 452 via the network 440 to the one or more servers 430. The network 440 can include one or more of a wireless network, such as a WiFi network or cellular data network, and a wired network. The network 440 can include, in part, the Internet, a wide area network or a local area network. The signal 452 can include the identifier of the touchscreen input device 410. The one or more servers 430 may have configuration information associated with the identifier of the touchscreen input device 410. For example, the user may have registered the identifier of the touchscreen input device 410 with the user's account on the one or more servers 430. The user could also provide the one or more servers 430 with configuration information to be provided to computing devices when the one or more servers 430 receive an identifier of the touchscreen input device 410 from the devices. The configuration information can include settings and/or owned content, as described above. The configuration information can also include an indication of one or more actions that can be performed by computing device 420. For example, the user may have made particular content or files available for download, and one action that can be performed by computing device 420 is downloading the particular content or files. In another example, the user may have copied particular text or other content that is stored on the one or more servers 430 and can be pasted on the computing device 420.

The one or more servers 430 can determine configuration information that is associated with the identifier of the touchscreen input device 410 and that is applicable to the computing device 420. The configuration information is applicable to the computing device 420 if it can be implemented on or performed by the computing device 420. The one or more servers 430 can send a signal 453 via the network 440 to the computing device 420 indicating the configuration information that is associated with the identifier of the touchscreen input device 410 and that is applicable to the computing device 420. In this way, any configuration information set by a user of the touchscreen input device 410 on the one or more servers 430 can be sent to the computing device 420 when the touchscreen input device 410 is used with the computing device 420. One possible benefit of such a system is that the user of the touchscreen input device 410 may be able to have the computing device 420 be configured with particular settings, make content available and/or be available to perform certain actions, merely by using the touchscreen input device 410 with the computing device 420. This could even be the case on the first time that the user interacts with the computing device 420.

Optionally, after receiving the wireless signal 451 with the identifier of the touchscreen input device 410, and before the computing device 420 changes any configurations or sends the signal 452, the computing device 420 can perform a verification of an identity of the user and/or the touchscreen input device 410. Verifying the identity of the user could include the user inputting certain information, such as a password, a personal identification number, a signature and the like. Verifying the touchscreen input device 410 can include receiving a particular code from the touchscreen input device 410. The code can be based on a time-based key that would be difficult or impossible for an imposer to reproduce without having the key. The code can be sent from the touchscreen input device 410 to the computing device 420 in the wireless signal 451 with the identifier of the touchscreen input device 410. Other forms of authentication could also be used.

FIG. 5 depicts an example of a system 500 that includes a touchscreen input device 510, a first computing device 520, one or more servers 530, a network 540 and a second computing device 550. When the touchscreen input device 510 is in proximity with the first computing device 520, it can send a wireless signal 561 that includes an identifier of the touchscreen input device 510 to the first computing device 520. If the first computing device 520 includes any configuration information associated with the identifier of the touchscreen input device 510, the first computing device 520 can implement changes indicated by the configuration information. The first computing device 520 can also send a signal 562 with the identifier of the touchscreen input device 510 to the one or more servers 530 via the network 540.

The one or more servers 530 may have configuration information associated with the identifier of the touchscreen input device 510. For example, the user may have registered the identifier of the touchscreen input device 510 with the user's account on the one or more servers 530. The user could also provide the one or more servers 530 with configuration information to be provided to computing devices when the one or more servers 530 receive an identifier of the touchscreen input device 510 from the devices. The configuration information can include settings, owned content and/or one or more actions that can be performed, as described above. The one or more servers 530 can determine configuration information that is associated with the identifier of the touchscreen input device 510 and that is applicable to the first computing device 520. The one or more servers 530 can send a signal 563 via the network 540 to the first computing device 520 indicating the configuration information that is associated with the identifier of the touchscreen input device 510 and that is applicable to the first computing device 520.

The one or more servers 530 may also determine whether the first computing device 520 is owned by a user associated with the touchscreen input device 510. For example, in addition to registering the identifier of the touchscreen input device 510 with the user's account on the one or more servers 530, the user may also have registered the first computing device 520 with the user's account on the one or more servers 530 as being a computing device owned by the user. If the one or more servers 530 determine that the first computing device 520 is owned by a user associated with the touchscreen input device 510, the one or more servers 530 may include in the signal 563 to the first computing device 520 an indication of additional actions that can be performed by the user. For example, the additional actions can include an ability for the user to set configuration information on the one or more servers 530, to make content or text on the first computing device 520 available for use by the touchscreen input device 510 on other computing devices and the like. The additional actions can include any number of other actions that could be performed by the user on a computing device owned by the user.

The user can use the touchscreen input device 510 to interact with the first computing device 520. As part of the interaction with first computing device 520, the user can indicate actions that could be performed on other computing devices using the touchscreen input device 510. For example, the user can copy or cut text, content, files and/or other information on first computing device 520 and make that copied or cut information available for pasting other computing device. In this case, the first computing device 520 can send a signal 564 to the one or more servers 530 indicating the copied or cut information available for pasting other computing device. The signal 564 can include the copied or cut information if the information is not already included on the one or more servers 530. However, if the copied or cut information includes information that is already on the one or more servers 530 (e.g., the user copied an application that is available for download from the one or more servers 530), then the signal 564 can include merely an indication of that copied or cut information (e.g., an identifier of the application). The signal 546 can also include indications of multiple actions that could be performed on other computing device, such as making a particular song available for download onto another computing device and copying a document that can be pasted onto another computing device.

After using the touchscreen input device 510 to interface with the first computing device 520, the touchscreen input device 510 can be used to interface with the second computing device 550. When the touchscreen input device 510 is in proximity with the second computing device 550, it can send a wireless signal 565 that includes an identifier of the touchscreen input device 510 to the second computing device 550. If the second computing device 550 includes any configuration information associated with the identifier of the touchscreen input device 510, the second computing device 550 can implement changes indicated by the configuration information. The second computing device 550 can also send a signal 566 with the identifier of the touchscreen input device 510 to the one or more servers 530 via the network 540.

The one or more servers 530 one or more servers 530 can determine configuration information that is associated with the identifier of the touchscreen input device 510 and that is applicable to the second computing device 550. The one or more servers 530 can also determine whether the second computing device 550 is owned by the user of the touchscreen input device 510. The one or more servers 530 can send a signal 563 via the network 540 to the second computing device 550 indicating the configuration information that is associated with the identifier of the touchscreen input device 510 and that is applicable to the second computing device 550. Whether configuration information is applicable to the second computing device 550 can be based, at least in part, on whether the one or more servers 530 determines that the second computing device 550 is owned by the user of the touchscreen input device 510. The one or more servers 530 can send a signal 567 via the network 540 to the second computing device 550 indicating the configuration information that is associated with the identifier of the touchscreen input device 510 and that is applicable to the second computing device 550.

As described above, one example of the use of system 500 is that a user can copy content on first computing device 520 using the touchscreen input device 510, and the first computing device 520 can send a signal 564 that includes an indication of the copied content and/or the copied content itself. Later, the user can interact with the second computing device 550 using touchscreen input device 510. The second computing device 550 can send the signal 566 with the identifier of the touchscreen input device 510 to the one or more servers 530. The one or more servers 530 can send configuration information in the signal 567 back to the second computing device 550. The configuration information can include a possible action of pasting the copied content onto the second computing device 550. If the user opts to paste the copied content, the user will have been able to copy content from the first computing device 520 to the second computing device 550 without the first and second computing devices 520 and 550 communicating directly with each other and without transferring the content on some form of portable storage medium between the first computing device 520 to the second computing device 550. The first and second computing devices 520 and 550 also do not need to be in proximity with each other.

As an alternative to the process shown in FIG. 5, when content is copied on one computing device, it can automatically be "pushed" to another computing device. For example, in the case of the first and second computing devices 520 and 550, a user may instruct the one or more servers 530 to automatically send the second computing device 550 any content copied on the first computing device 520 using a particular touchscreen input device 510. Thus, when the user copies content on the first computing device 520 using touchscreen input device 510, the first computing device 520 can send a communication to the one or more servers 530 indicating that the content was copied on the first computing device 520. An indication of the touchscreen input device 510 may have been sent before the communication indicating that the content was copied on the first computing device 520 or with the communication indicating that the content was copied on the first computing device 520. The one or more servers 530 can automatically initiate a download of the content from the one or more servers 530 to the second computing device 550. The automatic download of the content from the one or more servers 530 to the second computing device 550 may occur regardless of whether the touchscreen input device 510 is later used to interact with the second computing device 550.

Figure 6B:
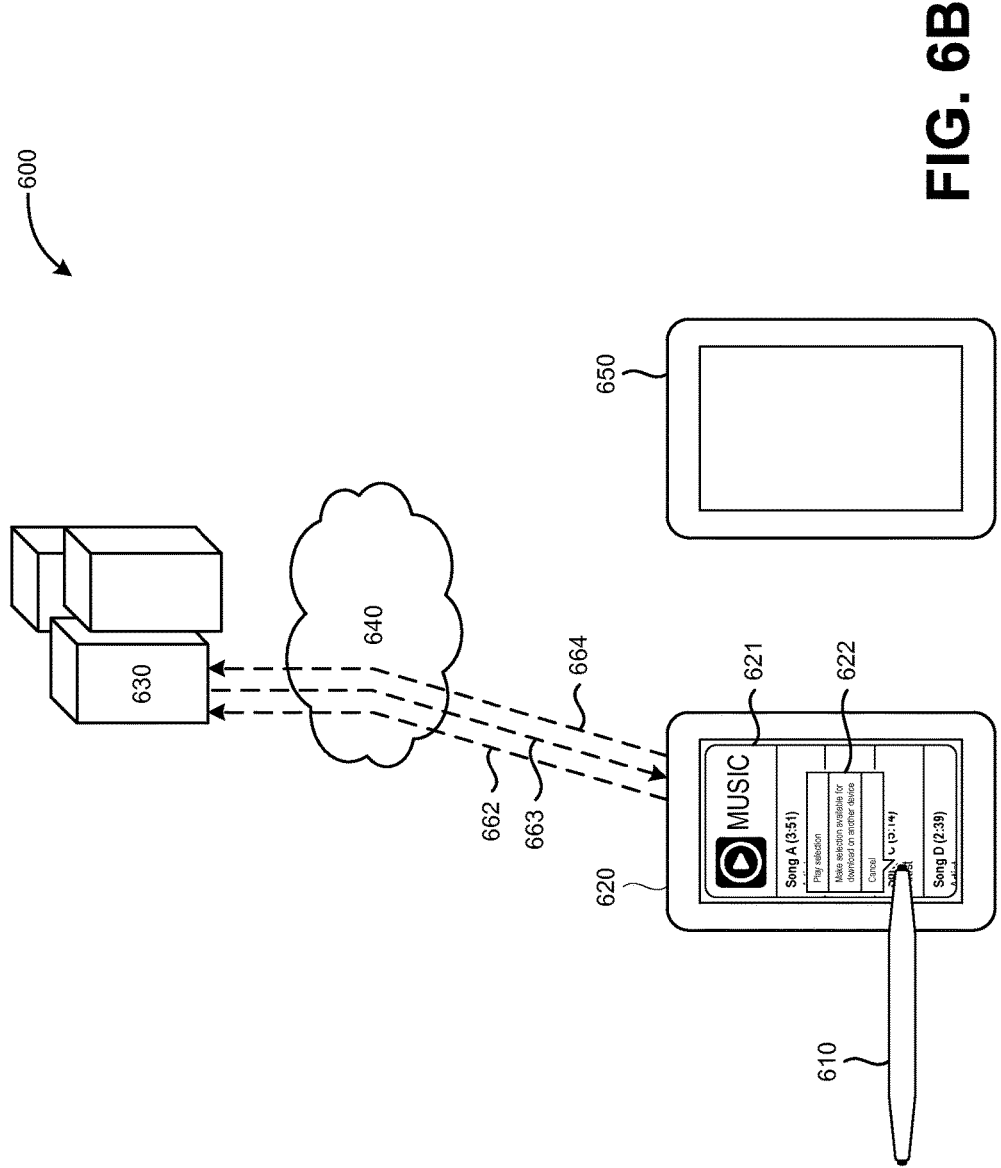

FIGS. 6A to 6C depict various instances of a system 600 that can be used to transfer a music item from a first computing device 620 to a second computing device 650. The system 600 includes a touchscreen input device 610, a first computing device 620, one or more servers 630, a network 640 and a second computing device 650. As depicted in FIG. 6A, when the touchscreen input device 610 is in proximity with the first computing device 620, it can send a wireless signal 661 that includes an identifier of the touchscreen input device 610 to the first computing device 620. The first computing device 620 includes a music application 621 that can be used to manage and play music items on the first computing device 620. The first computing device 620 can also send a signal 662 with the identifier of the touchscreen input device 610 to the one or more servers 630 via the network 640. The one or more servers 630 can send configuration information to the first computing device 620 via a signal 663. The configuration information can indicate that a user of the touchscreen input device 610 can make music items in the music application 621 on the first computing device 620 available for download on other computing devices.

As depicted in FIG. 6B, the touchscreen input device 610 can be used to select one of the music items shown in the music application 621. When one of the music items in the music application 621 is selected, an option bubble 622 can appear indicating the options available for that selected music item. Among those options depicted in FIG. 6B is an option to make the selected music item available for download on other computing devices. If the option to make the selected music item available for download on other computing devices is selection, then a signal 664 can be sent from the first computing device 620 to the one or more servers 630 via the network 640. The one or more servers 630 can store an indication that the selected music item has been selected to be available for download on other computing devices. The indication can be associated with the identifier of the touchscreen input device 610, with an account associated with the identifier of the touchscreen input device 610, with an account of a user of the touchscreen input device 610 or in any other way.

As depicted in FIG. 6C, when the touchscreen input device 610 is in proximity with the second computing device 650, it can send a wireless signal 665 that includes an identifier of the touchscreen input device 610 to the second computing device 650. The second computing device 650 includes a music application 651 that can be used to manage and play music items on the second computing device 650. The second computing device 650 can also send a signal 666 with the identifier of the touchscreen input device 610 to the one or more servers 630 via the network 640. The one or more servers 630 can send configuration information to the second computing device 650 via a signal 667. The configuration information can indicate that the music item previously selected on the first computing device 620 is available for download on the second computing device 650. The second computing device 650 can display a bubble 652 indicating that the music item is available for download and asking whether the music items should be downloaded. The signal 667 can also include an identifier of a user of the touchscreen input device 610 or an account of the touchscreen input device 610, and that identifier can be displayed, such as in the bubble 652 depicted in FIG. 6C. If the user selects the "YES" button, the second computing device 650 can download the music item.

From the perspective of a user of the touchscreen input device 610, the series of actions depicted in FIGS. 6A to 6C may give the user the impression of being able to "copy" the song on the first computing device 620 and "paste" the song on the second computing device 650. This experience is made possible because the first computing device 620 and the second computing device 650 can receive the identifier of the touchscreen input device 610 and interact with the one or more servers 630 using the identifier of the touchscreen input device 610. Beyond transferring songs in this manner, many other actions are possible. In one example, a file (e.g., a word-processing document) could be copied on one computing device and downloaded to another computing device. In another example, text (e.g., text in a word-processing document) could be copied on one computing device and downloaded to another computing device. In another example, two users may be playing a game, each using their own computing device. One player can used a touchscreen input device to select an item on that player's computing device and then use the same touchscreen input device to interact with the other computing device and transfer the item to the other player. Many other such examples are possible.

Figure 6D:
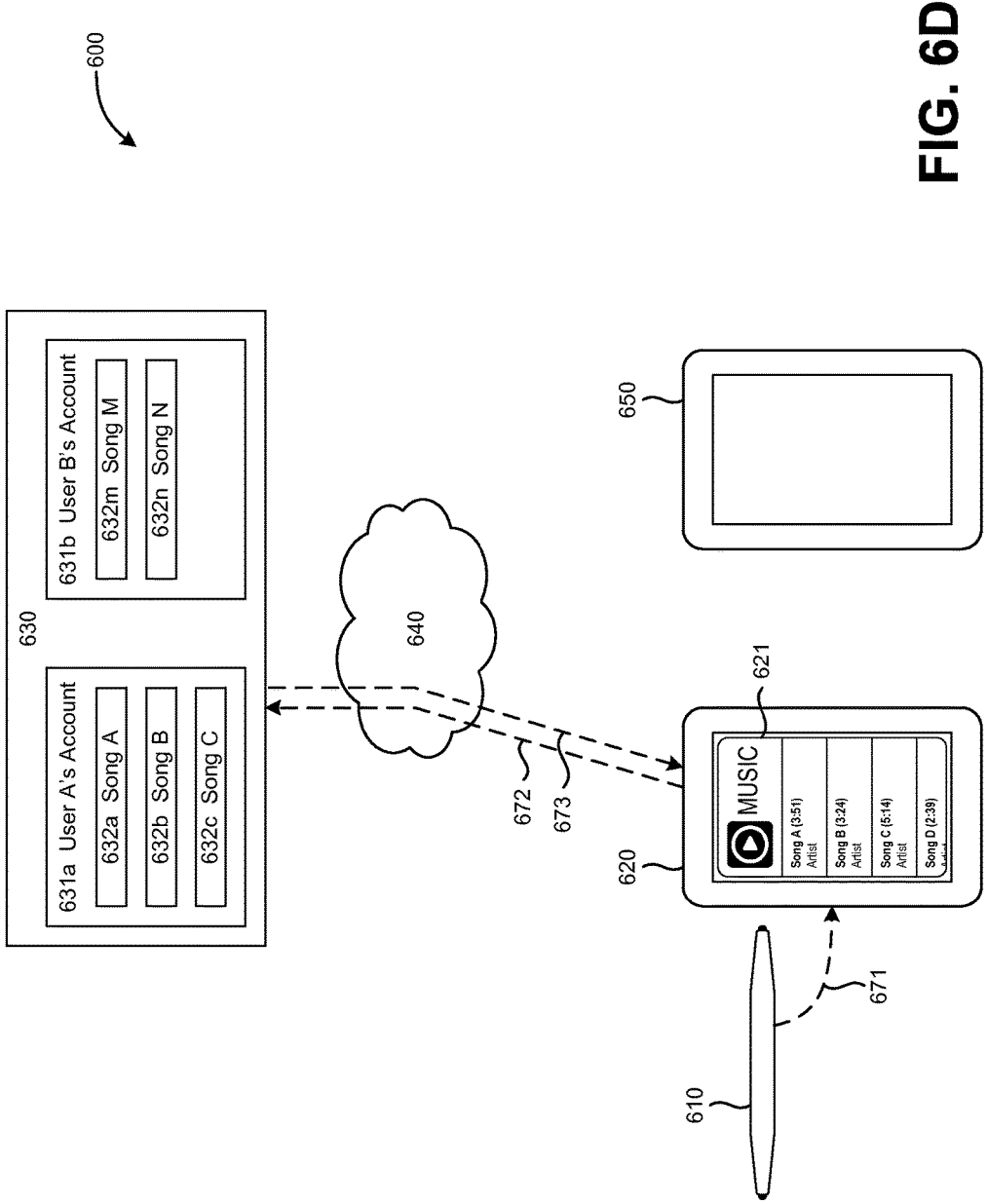

FIGS. 6D to 6F depict how system 600 can be used to transfer a music item from a first user account 631a to a second user account 631b. The one or more servers 630 include a first user account 631a associated with User A and a second user account 631b associated with User B. The first and second user accounts 631a and 631b can include indications of content associated with User A and User B. The first user account 631a indicates that Song A 632a, Song B 632b, and Song C 632c are accessible to User A. The second user account 631b indicates that Song M 632m and Song N 632n are accessible to User B. While the content depicted in FIGS. 6D to 6F includes indications of songs, any other type of content could be indicated in the first and second user accounts 631a and 631b. Identifiers of touch screen devices can also be associated with each of the first and second user accounts 631a and 631b. For example, an identifier of User A's touchscreen input can be associated with the first user account 631a and an identifier of User B's touchscreen input can be associated with the first user account 631b.

As depicted in FIG. 6D, when the touchscreen input device 610 is in proximity with the first computing device 620, it can send a wireless signal 671 that includes an identifier of the touchscreen input device 610 to the first computing device 620. The first computing device 620 can send a signal 672 with the identifier of the touchscreen input device 610 to the one or more servers 630 via the network 640. The identifier of the touchscreen input device 610 can be associated with the first user account 631a. The one or more servers 630 can send configuration information to the first computing device 620 via a signal 673. The configuration information can indicate that a user of the touchscreen input device 610 can send music items in the music application 621 on the first computing device 620 to another user's account.

As depicted in FIG. 6E, the touchscreen input device 610 can be used to select one of the music items shown in the music application 621. When one of the music items in the music application 621 is selected, an option bubble 622 can appear indicating the options available for that selected music item. Among those options depicted in FIG. 6B is an option to send the selected music item available to a friend. If the option to send the selected music item to a friend is selected, then a signal 674 can be sent from the first computing device 620 to the one or more servers 630 via the network 640. The one or more servers 630 can associate Song C 632c with the second user account 631b. The user may select the particular friend or a name of the friend's account when selecting content to be made available to a friend.

As depicted in FIG. 6F, when a second touchscreen input device 680 is in proximity with the second computing device 650, it can send a wireless signal 675 that includes an identifier of the second touchscreen input device 680 to the second computing device 650. The second computing device 650 can also send a signal 676 with the identifier of the second touchscreen input device 680 to the one or more servers 630 via the network 640. The identifier of the second touchscreen input device 680 can be associated with the second user account 631b. The one or more servers 630 can send configuration information to the second computing device 650 via a signal 677. The configuration information can indicate that Song C 632c is available for download on the second computing device 650. The second computing device 650 can display a bubble 652 indicating that the music item is available for download and asking whether the music items should be downloaded. The signal 677 can also include an identifier of a user of the touchscreen input device 610 or an account of the touchscreen input device 610. If the user selects the "YES" button, the second computing device 650 can download the music item.

From the perspective of a user of the touchscreen input device 610, the series of actions depicted in FIGS. 6D to 6F may give User A and B the impression of being able to send Song C to and from each other using their touchscreen input devices. This experience is made possible because the one or more servers 630 include user accounts for both users and associates those accounts with identifiers of the users' touchscreen input devices. Beyond transferring songs in this manner, many other actions are possible. In one example, a file (e.g., a word-processing document) could be transferred from one user's account to another. In another example, text (e.g., text in a word-processing document) could be transferred from one user's account to another. Many other such examples are possible.

Other options or actions, beyond merely sharing content, are possible using the system depicted in FIGS. 6D to 6F. In one embodiment, a user can revoke access to content that has previously been shared. For example, a user can use the touchscreen input device 710 with computing device 620 to request that User B no longer have rights to Song C 632c that was previously shared by User A. The computing device can send the one or more servers 630 an indication of the first input device 610 and an indication that the sharing of Song C 632c with user account 631b has been revoked.

In another embodiment, a user can pull content from another user's account using a touchscreen input device. For example, a user can use touchscreen input device 610 with computing device 620 to request that user account 631a have access to Song D 632d. The access can be temporary access, such as a loan of Song D 632d, a sample period to listen to Song D 632d, and the like. The access can also be indefinite access, such as Song D 632d being given from the user account 632b to the user account 632a. The computing device 620 can send to the one or more servers 630 an indication of the touchscreen input device 620 and an indication of the content for which access is being requested. If user account 631a (which is associated with touchscreen input device 610) is eligible to have access to the requested content, the one or more servers 630 can provide the user account 631a with access to the content.

In yet another embodiment, a user can transfer ownership of content to another account. For example, a user can use the touchscreen input device 710 with computing device 620 to request that Song C 632c be given to User B. The computing device can send the one or more servers 630 an indication of the first input device 610 and an indication that Song C 632c is to be transferred from user account 631a to user account 631b. The one or more servers 630 can give user account 631b access to Song C 632c and take away access from user account 631a. In this way, the rights that User A may have had to Song C 632c are effectively given to User B.

Figure 7:
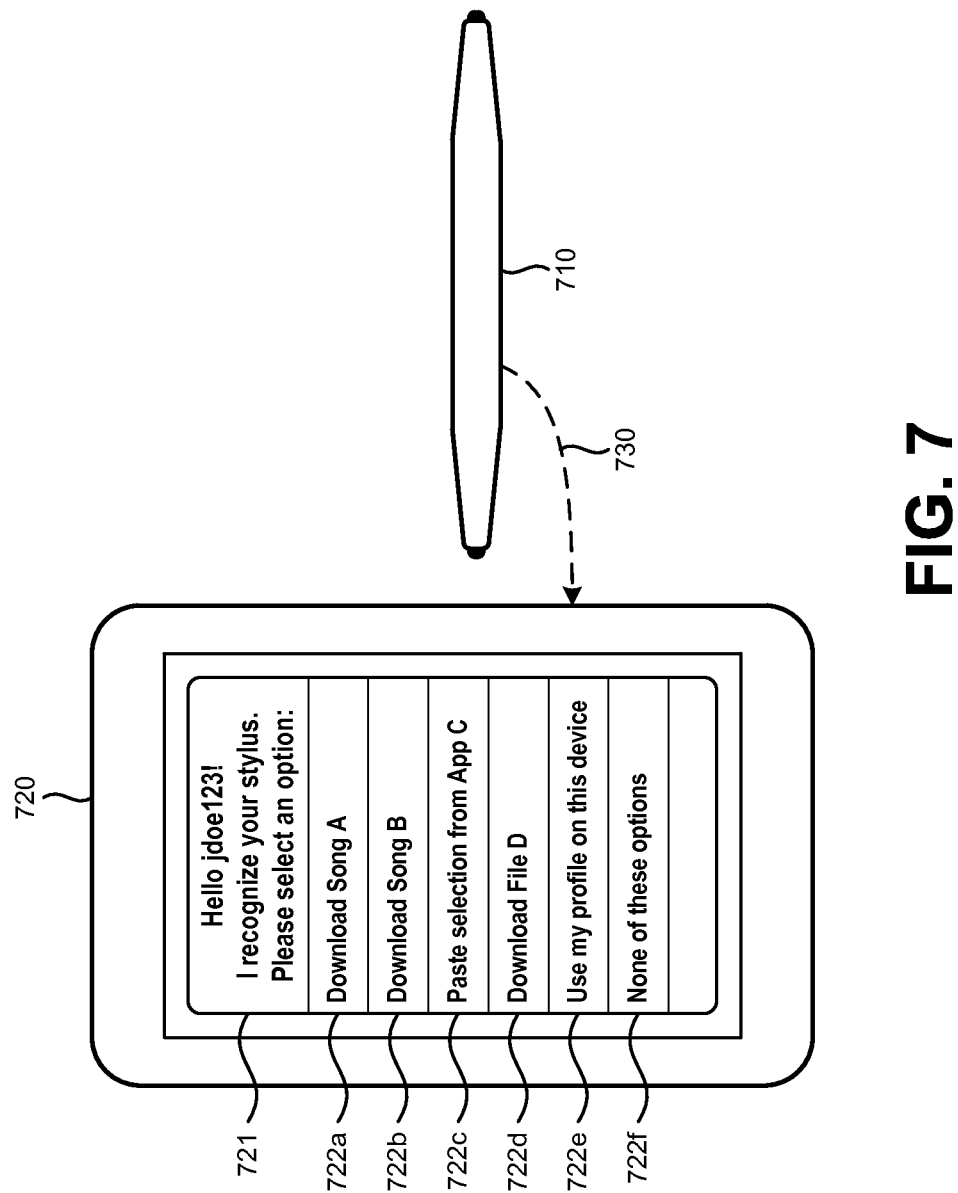
FIG. 7 depicts an example of an interaction of a touchscreen input device and a computing device.

FIG. 7 depicts an example of an interaction of a touchscreen input device 710 and a computing device 720. When the touchscreen input device 710 is in proximity with the computing device 720, it can send a wireless signal 730 that includes an identifier of the touchscreen input device 710 to the computing device 720. After receiving the identifier of the touchscreen input device 710 to the computing device 720, the computing device 720 can display a user indication 721 and possible actions 722a-f that can be selected by the user. The user indication 721 and the possible actions 722a-f can be stored locally in the computing device 720 and retrieved by the computing device 720 when the computing device 720 receives the wireless signal 730 that includes the identifier of the touchscreen input device 710. Alternatively, the user indication 721 and the possible actions 722a-f can be stored in a remote server. The computing device 720 can obtain the user indication 721 and the possible actions 722 by sending the indication of the identifier of the touchscreen input device 710 from the wireless signal 730 to the remote server and receiving indications of the user indication 721 and the possible actions 722a-f back from the remote server.

The possible actions 722a-f depicted in FIG. 7 include options to download songs 722a and 722b, an option to paste a selection from a particular application 722c, an option to download a particular file 722d, an option to use a particular profile 722e on the computing device 720 and an option to not use any of the displayed options 722f. Examples and embodiments of downloading songs, files, selections from applications and the like are discussed above. Regarding the option to use a particular profile 722e, the user may have registered profile settings with the computing device 720 or a remote server. The profile settings can include settings, such as a particular order of applications on a home screen of the computing device 720, particular bookmarks in a web browser operating on the computing device 720, individual login credentials being used with particular applications on the computing device 720 and the like. If this option to use a particular profile 722e is selected, the computing device 720 can automatically configure settings on the computing device 720 according to the user's profile. Such an option would allow a user to automatically have the computing device 720 configured to the user's profile, even if the user had not previously used the computing device 720, merely by using the user's touchscreen input device 710 with the computing device 720.

An ability to have a particular user profile associated with a touchscreen input device can be useful in a number of contexts. For example, a household can include multiple touchscreen devices that are used by multiple members of the household. Different household members can have their own touchscreen input device and the computing devices in the household can have access to a user profile associated with each of the touchscreen input devices. User profiles associated with the touchscreen input devices can be stored locally on the computing devices or accessible from another location, such as a central computing device in the household or a remote server. In this example, any of the household members with a touchscreen input device may be able to load their own user profile onto any of the computing devices merely using their own touchscreen input device to interact with one of the computing devices. In another example, an employer can have a number of computing devices for use by employees where the computing devices are not configured to any one employee. When an employee uses the employee's touchscreen input device to interact with one of the computing devices, the computing device can use an identifier transmitted from the employee's touchscreen input device to the computing device to load a user profile associated with the employee's touchscreen input device.

Anther context where associating a user profile with a touchscreen input device is a situation where a particular user may use a number of different computing devices. For example, on a school or college campus, a student may have access to a number of computing devices. The campus can have a computer lab with computing devices accessible to students, a library with computing devices accessible to students, classrooms with computing devices accessible to students (e.g., at each desk in classrooms), and other locations with computing devices accessible to students. A student can have a touchscreen input device that wirelessly sends an identifier to the touchscreen input device to one of the computing devices when the touchscreen input device is in proximity with the computing device. When one of the computing devices receives the identifier of the student's touchscreen input device, it can load the student's profile on that computing device.

Loading the student's profile can include the computing device downloading settings and configurations for that student, and loading the settings and configurations onto the computing device. In such a case, the settings and configurations can be in a configuration or other format that may be convenient for downloading. The student can use the student's profile on that computing device until the student's touchscreen input device is no longer in proximity with that computing device. At that point, the user' profile can be taken off of the computing device. When the student's profile is loaded on the computing device, the student can interact with the device. Input information about inputs by the student can be sent back to the server and the server can update the user's profile based on the input information.

Loading the student's profile can also include rendering an instance of a virtualized computing environment on the computing device. In this case, a server may host a virtualized computing environment for the student. The virtualized computing environment can run software, such as an operating system, one or more applications, and the like. The virtualized computing environment can generate renderable content, such as audio and video content, that can be rendered by a remote computing device. The remote computing device can render the renderable content and receive inputs. Input information associated with the inputs can be sent back to the server for controlling the virtualized computing environment. The virtualized computing environment can continue to be hosted by the server regardless of whether or not a remote computing device is rendering the content. When the student approaches a computing device, such as at a desk in a classroom, the student's touchscreen input device can send an identifier to the computing device. The computing device can send the identifier of the student's touchscreen input device to a server. The server can send content associated with the student's virtualized computing environment to the computing device. The computing device can render the content, receiving inputs from the student, and send input information back to the server for controlling the virtualized computing environment. When the student walks away from the computing device (i.e. when the student's touchscreen input device is no longer in proximity with the computing device), the computing device can stop rendering the content but the virtualized computing environment cam continue to be hosted by the server. When the student approaches another computing device, such as a computing device in the library, the computing device in the library can receive an identifier of the student's touchscreen input device and send that to the server. The server can begin sending content to be rendered by the computing device in the library. In this way, the student is able to continue using the same virtual computing environment at any computing device on the campus merely by using the student's touchscreen input device.

In another embodiment, when two users want to use the same computing device at the same time, the computing device can receive identifiers of both of the users' touchscreen input devices. In such a case, the computing device can load a hybrid profile that is a combination of some or all of the first user's profile and some or all of the second user's profile. Such a hybrid profile could allow the two users to access resources (e.g., websites, files, etc) that are accessible to either user and allow the two users to easily share content with each other. A hybrid profile could also allow for the two users to work collaboratively on the same computing device. One example of this collaborative effect in the school environment is where two students work on a group project and can load a hybrid profile on a single computing device to work together and access everything that either student has access to.

Figure 8:
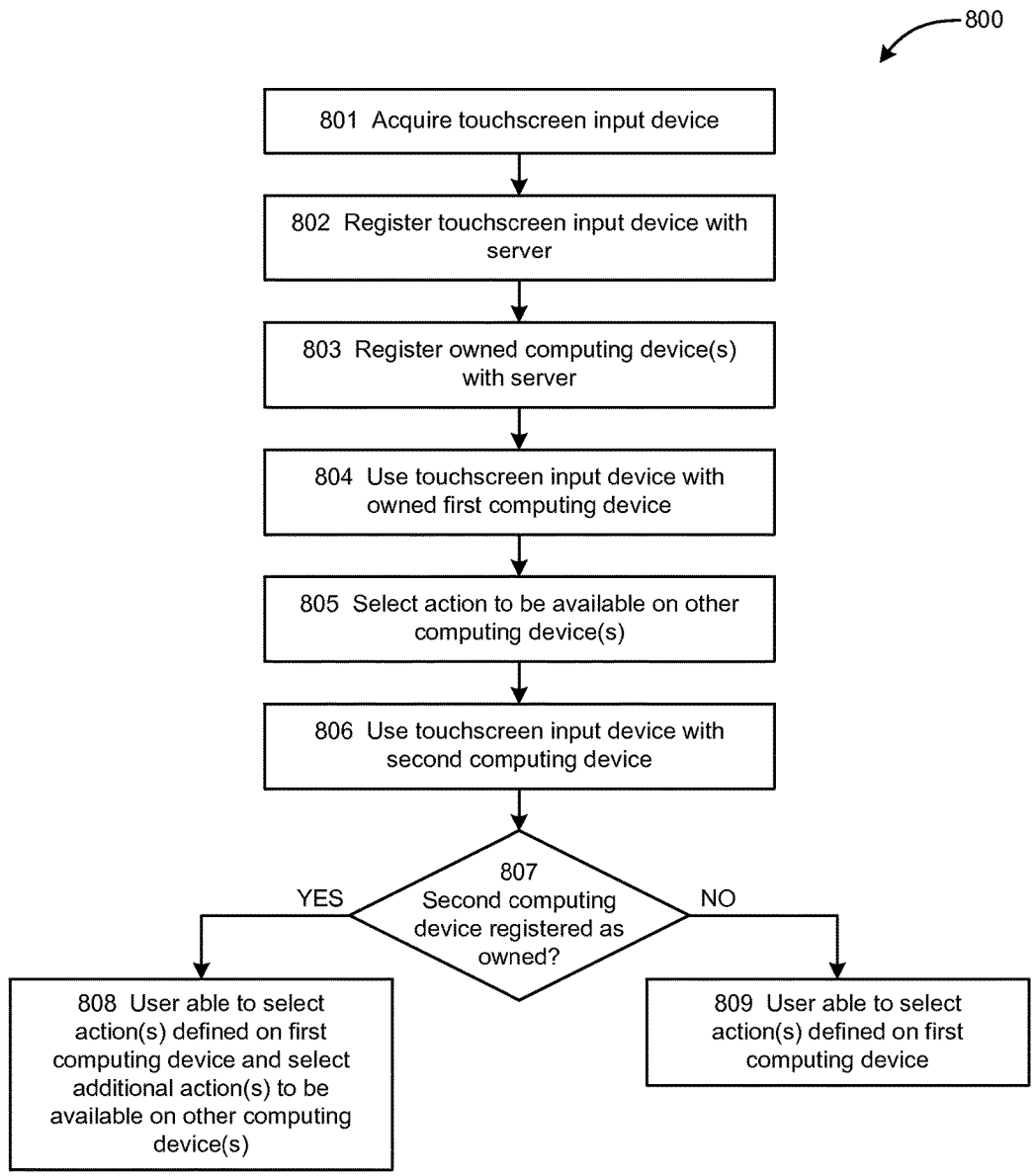
FIG. 8 depicts an example of a method by which a user of a touchscreen input device can register the touchscreen input device and interact with computing devices.

FIG. 8 depicts an example of a method 800 by which a user of a touchscreen input device can register the touchscreen input device and interact with computing devices. At block 801, the user can acquire a touchscreen input device. The user can purchase the touchscreen input device, receive a touchscreen input device as a gift or acquire the touchscreen input device in any other manner. At block 802, the user can register the touchscreen input device with a server. To register the touchscreen input device, the user can provide a serial number or other identifier of the touchscreen input device to the server. The user can have an account associated with the server, and the touchscreen input device can be registered to the user's account. At block 803, the user can register one or more owned computing devices with the server. An owned computing device is one for which the user has management rights, such as a personal computing device that the user purchased, a computing device provided by an employer of the user or any other similar computing device. The server can give more permissions to a user on an owned computing device than on other computing devices. For example, the server can permit a user to designate possible actions (e.g., making a file, song, text or other content available for download on another computing device) using the owned computing device. In another example, the server can permit a user's profile to be used on devices that are owned by the user.

At block 804, the user can use the touchscreen input device with a first computing device that is one of the owned computing devices. When the touchscreen input device is in proximity of the first computing device, the touchscreen input device can send a wireless signal to the first computing device that includes an identifier of the touchscreen input device. The first computing device can send the identifier of the touchscreen input device to the server. The server can provide the first computing device with permissions available to the touchscreen input device using the first computing device. In this particular case, since the first computing device has been registered as a device owned by the user and the touchscreen input device is associated with the user account, the server can indicate that certain actions can be performed on the first computing device, such as using the user's profile on the first computing device, copying content on the first computing device that can be downloaded onto other computing devices and so forth.

At block 805, the user can select an action on the first computing device that can be performed on another computing device. The user can copy content, such as a music item, a file, an application, text or other content, on the first computing device so that the content can be pasted to or downloaded to another computing device using the touchscreen input device. If the content is already accessible to the server (e.g., a music item or an application that was originally downloaded to the first computing device), the first computing device can send the server an indication of the content that has been copied. If the content is not accessible to the server (e.g., a file created locally on the first computing device or text entered into the first computing device), the first computing device can send the content to the server.

At block 806, the user can use the touchscreen input device with a second computing device. When the touchscreen input device is in proximity of the second computing device, the touchscreen input device can send a wireless signal to the second computing device that includes an identifier of the touchscreen input device. The second computing device can send the identifier of the touchscreen input device to the server. At block 807, a determination can be made whether the second computing device has been registered as an owned computing device associated with the touchscreen input device. If, at block 807, it is determined that the second computing device has been registered as an owned computing device, then, at block 808, the user is able to perform any of the actions previously defined on the first computing device (e.g., pasting the content that was copied on the first computing device), and the user is able to select additional actions on the second computing device that can be performed on another computing device (e.g., copying additional content on the second computing device that can be pasted or downloaded to another computing device). However, if, at block 807, it is determined that the second computing device has not been registered as an owned computing device, then, at block 809, the user is able to perform any of actions previously defined on the first computing device (e.g., pasting the content that was copied on the first computing device). Because the second computing device has not been registered as an owned computing device, the server may not permit the user to select additional actions on the second computing device that can be performed on another computing device.

Figure 9:
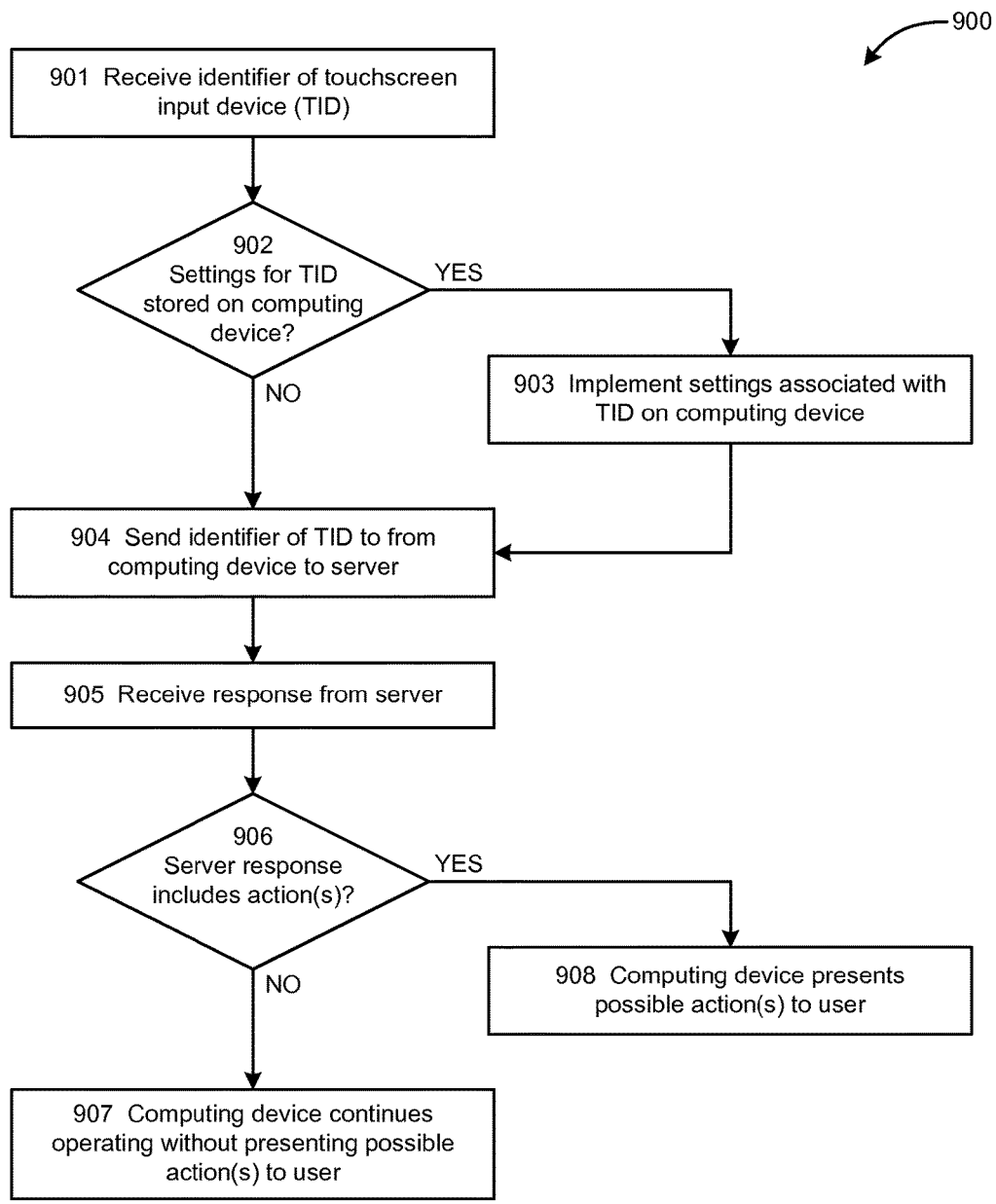
FIG. 9 depicts an example of a method that could be performed by a computing device when interacting with a touchscreen input device.

FIG. 9 depicts an example of a method 900 that could be performed by a computing device when interacting with a touchscreen input device. At block 901, the computing device can receive an identifier of a touchscreen input device. The identifier of the touchscreen input device can be received via a wireless signal, such as an NFC signal, a Bluetooth® signal, a WiFi signal and the like. At block 902, the computing device can determine whether any settings associated with the identifier of the touchscreen input device have been stored in the computing device. For example, the computing device may have stored profile information associated with the identifier of the touchscreen input device, configuration settings associated with the identifier of the touchscreen input device touchscreen input device or any other type of settings. If, at block 902, it is determined that settings associated with the identifier of the touchscreen input device have been stored in the computing device, then, at block 903, the computing device can implement those settings associated with the identifier of the touchscreen input device. Implementing the settings can include prompting the user to indicate whether those settings should be applied on the computing device or automatically applying the settings in response to receiving the identifier of the touchscreen input device. After block 903, the method can proceed to block 904. However, if, at block 902, it is determined that settings associated with the identifier of the touchscreen input device have not been stored in the computing device, then the method can proceed directly to block 904.

At block 904, the computing device can send the identifier of the touchscreen input device to a server. The server may be able to identify that the touchscreen input device has been registered with the server, identify whether the computing device has been registered as a computing device that is owned by a user of the touchscreen input device, identify whether the touchscreen input device has been able to define possible actions that can be used on the computing device and so forth. At block 905, the computing device can receive a response from the server. The response can include an indication of possible actions that had been defined on another computing device using the touchscreen input device. The response can also include permissions related to actions that can be defined by the user of the touchscreen input device on the computing device. The response can also indicate that no possible actions have been defined by the user of the touchscreen input device.

At block 906, the computing device can determine whether the response from the server included one or more actions associated with the touchscreen input device that can be performed on the computing device. The one or more actions associated with the touchscreen input device can include downloading content (e.g., a music item, a file, an application, text or other content) to the computing device, implementing a user profile on the computing device or any other possible action. If, at block 906, the computing device determines that the response from the server does not include one or more actions associated with the touchscreen input device, then, at block 907, the computing device can allow the user to continue using the computing device with the touchscreen input device without presenting the user with any additional actions. However, if, at block 906, the computing device determines that the response from the server includes one or more actions associated with the touchscreen input device, then, at block 908, the computing device can present the one or more options to the user. If any of those actions are selected by the user, the computing device can perform the selected action.

Figure 10:
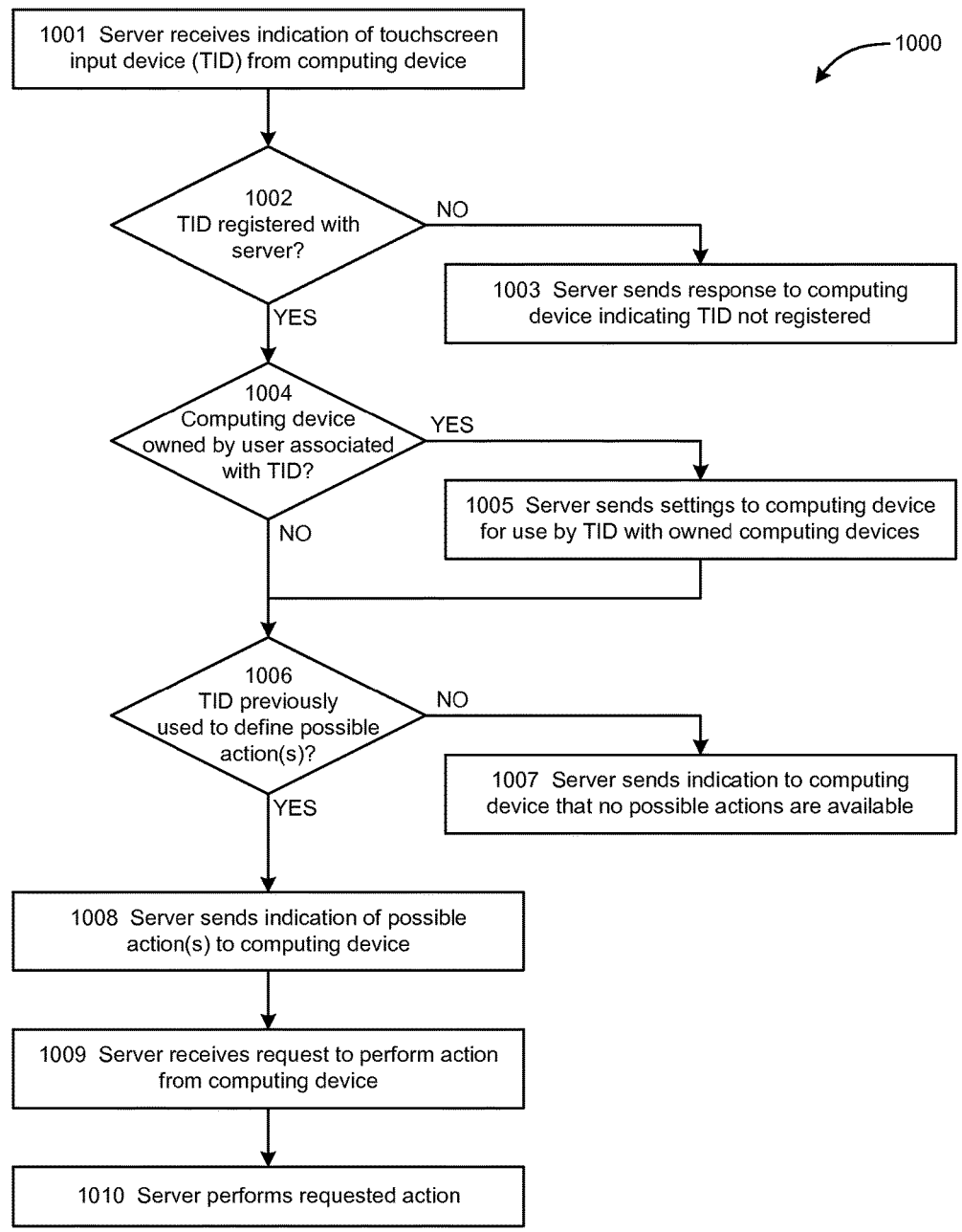
FIG. 10 depicts an example of a method that can be performed by a server.

FIG. 10 depicts an example of a method 1000 that can be performed by a server. At block 1001, the server can receive an indication of a touchscreen input device from a computing device. The computing device could have received the indication of the touchscreen input device from the touchscreen input device when the touchscreen input device was brought into proximity with the computing device. At block 1002, the server can determine whether the touchscreen input device has been registered with the server. If, at block 1002, the server determines that the touchscreen input device has not been registered with the server, then, at block 1003, the server can send an indication to the computing device that the touchscreen input device has not been registered with the server. In this case, the computing device can continue permitting the touchscreen input device to interact with the computing device, though no actions or settings associated with the touchscreen input device will be available. However, if, at block 1002, the server determines that the touchscreen input device has been registered with the server, then the method can proceed to block 1004.

At block 1004, the server can determine whether the computing device is one that has been registered as owned by a user of the touchscreen input device. If, at block 1004, the server determines that the computing device has been registered as owned by a user of the touchscreen input device, then, at block 1005, the server can send settings to the computing device that can be implemented by the user of the computing device. For example, the server can send profile settings or configuration settings to the computing device that the computing device can implement. The computing device can prompt the user whether such settings should be implemented before implementing the settings. After block 1005, the method can proceed to block 1006. However, if, at block 1004, the server determines that the computing device has not been registered as owned by a user of the touchscreen input device, then the method can proceed to block 1006.

At block 1006, the server can determine whether the touchscreen input device has previously been used to define possible actions that can be performed on the computing device. The one or more actions associated with the touchscreen input device can include downloading content (e.g., a music item, a file, an application, text or other content) to the computing device, implementing a user profile on the computing device or any other possible action. If, at block 1006, the server determines that the touchscreen input device has not previously been used to define possible actions that can be performed on the computing device, then, at block 1007, the server can send the computing device an indication that no possible actions are available. In this case, the computing device can allow the user to continue interacting with the computing device using the touchscreen input device even though no actions specific to the touchscreen input device are available. However, if, at block 1006, the server determines that the touchscreen input device has previously been used to define possible actions that can be performed on the computing device, then, at block 1008, the server can provide the computing device with an indication of those actions associated with the touchscreen input device that can be performed on the computing device.

At block 1009, the server can receive an indication from the computing device of one of the possible actions that has been selected. For example, the user may have selected an option to download content (e.g., a music item, an application, a file, text, etc.) that was copied on another computing device. At block 1010, the server can perform the selected action. For example, the server can transmit the selected content to the computing device.

Figure 11:
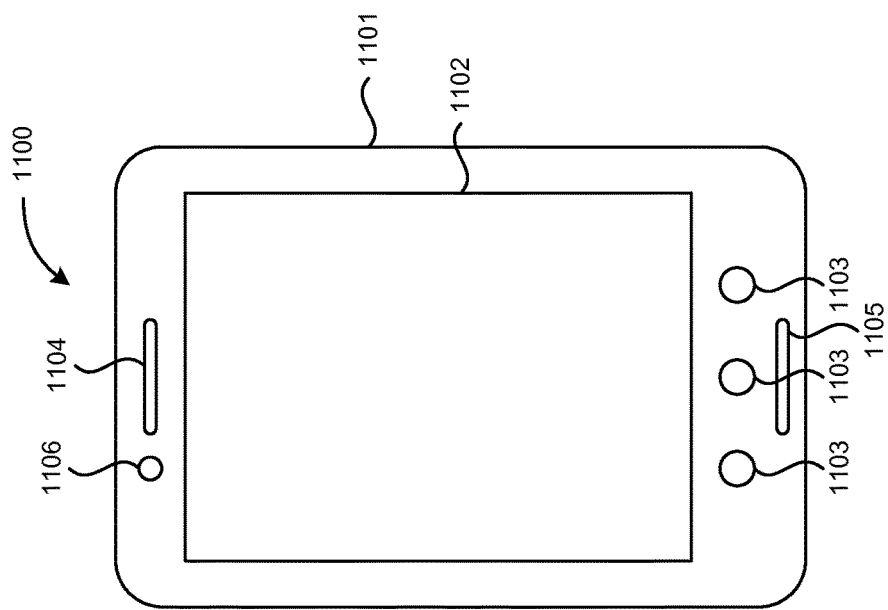
FIG. 11 depicts an embodiment of external components of a computing device.

FIG. 11 depicts an embodiment of external components of a computing device 1100. It should be understood that this is merely an example for discussion, and that a number of additional components, configurations, assemblies and combinations are possible as known in the art. Computing device 1100 can be any form of a computer, such as a desktop computer or laptop computer, a tablet computing device, a cell phone, a handheld computing device, or any other form of computing device. Computing device 1100 can include a housing 1101. The housing 1101 can be made of any material or combinations of materials, such as various types of plastic, metal, glass and combinations thereof, that is suitable to house the components of computing device 1100. Computing device 1100 can also include a display 1102 that can display images, text, any other type of visual information and any combination thereof. Display 1102 can also be a touchscreen display that is capable of sensing the presence and location of one or more touches of the display 1102. A touchscreen display can sense touches by a user, such as a touch by a finger or a hand, and touches by objects, such as by a stylus. Display 1102 can be part of a user interaction system of the computing device 1100.

Computing device 1100 can also include one or more hard buttons 1103 integrated into housing 1101. In one embodiment, the one or more hard buttons 1103 can include a single button, such as a home button or a power button. In another embodiment, the one or more hard buttons 1103 can include a small set of buttons, such as a power button, a home button and a back button. In yet another embodiment, the one or more hard buttons 1103 can include a large set of buttons, such as a full QWERTY keyboard, a keypad and the like. The one or more hard buttons 1103 can be part of the user interaction system of the computing device 1100.

Computing device 1100 can also include a speaker 1104 configured to emit sounds and a microphone 1105 configured to receive sounds. In the embodiment where computing device 1100 is a cell phone, speaker 1104 and microphone 1105 can be used to carry on a telephone call. In one embodiment, speaker 1104 can be configured to play sounds associated with graphics displayed on display 1102, such as during play of audiovisual material on computing device 1100. In another embodiment, microphone 1105 can receive audio sounds, which the computing device 1100 can interpret as user inputs. In addition, while not depicted in FIG. 11, computing device 1100 can also include an audio port, which can be connected to an external microphone and/or an external speaker or speakers. Computing device 1100 can send and receive audio signals via the audio port and interpret the received audio signals via the audio port just as it would interpret audio signals generated from sounds received by the microphone 1105.

Computing device 1100 can also include one or more optical devices 1106. In one embodiment, an optical device can include an optical sensor, such as an infrared sensor, a visible light sensor and/or any device that can sense light and/or electromagnetic energy. The detection of light and/or electromagnetic energy can be used by the computing device 1100 to control components of the computing device 1100, such as a level of light emitted by a backlight of display 1102, illumination of one or more hard buttons 1103 and any other aspect of computing device 1100. In another embodiment, an optical device can include an image-capturing device, such as a digital camera. An image-capturing device can include any device configured to capture an image, such as a complementary metal-oxide-semiconductor (CMOS) active pixel sensor (APS) and a charged coupled device (CCD). Images captured by one or more optical devices 1106 can be stored by the computing device 1100 as individual images or as a series of images in a video. Individual images and/or video images can be processed by computing device 1100 and interpreted as user inputs. While FIG. 11 depicts one of the optical devices 1106 pointing in the same direction as the display 1102, it is possible for computing device 1100 to have any number of optical devices 1106, and it is possible for one or more optical devices 1106 to be pointed in other directions, such as a rear-facing camera pointing in the opposite direction of display 1102.

Figure 12:
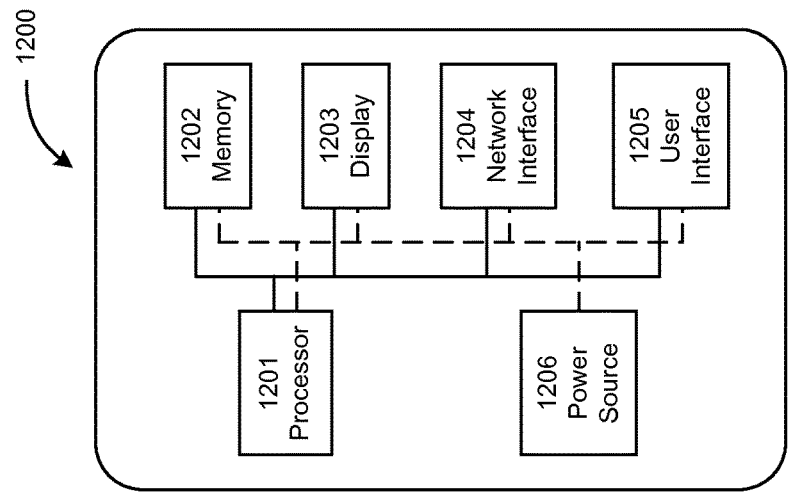
FIG. 12 depicts an embodiment of internal components of a computing device.

FIG. 12 depicts an embodiment of internal components of a computing device 1200. It should be understood that this is merely an example for discussion and that a number of additional components, configurations, assemblies and combinations are possible as known in the art. Computing device 1200 can include at least one processor 1201 that is able to execute instructions stored in one or more memories 1202. The one or more memories 1202 can include instructions for running an operating system, instructions for running one or more applications within the operating system, a system management agent and any other kind of instructions. The at least one processor 1201 can generate information on a display component 1203. Display component 1203 can include one or more of a display driver, a display card, display or any other hardware and/or software required to display an image or series of images. Computing device 1200 can also include a network interface 1204 that allows the device to send and receive information signals via a network. Network interface 1204 can include any type of network adapter for connecting to a network, such as an adapter to establish a connection to the Internet, to a wired or wireless intranet, to a cellular network or to a wireless network. Computing device 1200 can also include a user interface 1205. User interface 1205 can include one or more components, such as display 1102, one or more hard buttons 1103, speaker 1104, microphone 1105 and optical devices 1106, that can provide information to a user and/or receive inputs from a user. User interface 1205 can also include one or more external components, such as an external keyboard, external mouse, external microphone, external speaker and the like.

Computing device 1200 can include a power source 1206. Power source 1206 can provide power to any or all of the other components in computing device 1200. As depicted in FIG. 12, power source 1206 can be connected to, and provide power to, each of processor 1201, memory 1202, display 1203, network interface 1204 and user interface 1205. Power source can be any type of power source, such as one or more disposable batteries, a rechargeable battery and the like. In the embodiment where computing device 1200 is a portable device, such as a laptop computer, a tablet computer, a cell phone, a hand held computer and the like, the power source 1206 may need to provide power for a period of time between recharging of the power source 1206. When power source 1206 is not connected to an external power source, computing device 1200 is drawing on the power stored in power source 1206. The capacity of power source 1206 can vary with the type and size of power source 1206. The rate at which power source 1206 discharges depends on a number of factors, such as which components of computing device 1200 are active, how much power each of the active components are drawing from power source 1206 and the like.

Figure 13:
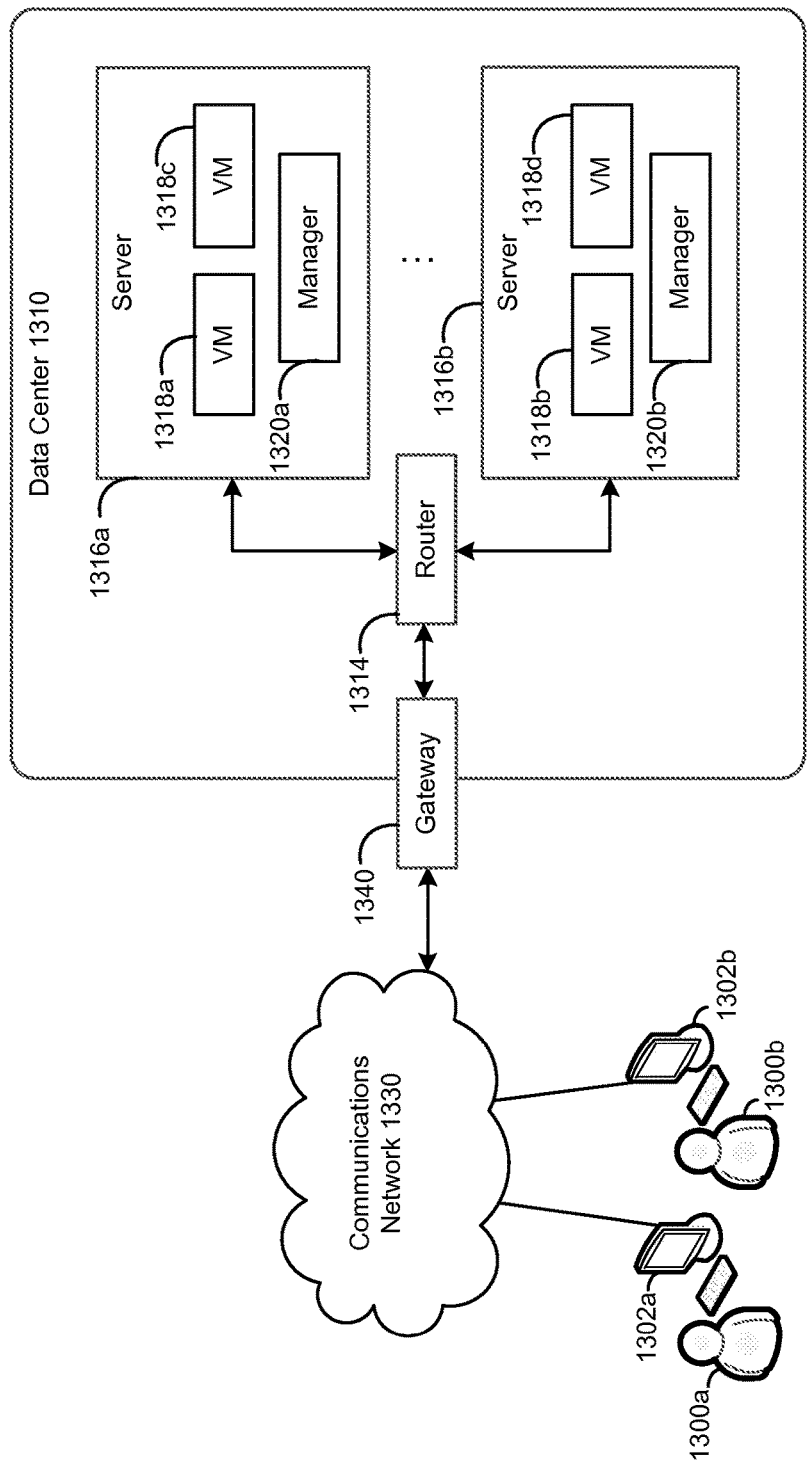
FIG. 13 depicts a diagram illustrating an example computing system that may be used in some embodiments.

FIG. 13 illustrates an example computing environment in which the embodiments described herein may be implemented. FIG. 13 is a diagram schematically illustrating an example of a data center 1310 that can provide computing resources to users 1300*a* and 1300*b* (which may be referred herein singularly as user 1300 or in the plural as users 1300) via user computers 1302*a* and 1302*b* (which may be referred herein singularly as computer 1302 or in the plural as computers 1302) via a communications network 1330. Data center 1310 may be configured to provide computing resources for executing applications on a permanent or an as-needed basis. The computing resources provided by data center 1310 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be general-purpose or may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These web services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols such as transmission control protocol (TCP) and less reliable transport layer protocols such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 1310 may include servers 1316*a-b* (which may be referred herein singularly as server 1316 or in the plural as servers 1316) that provide computing resources. These resources may be available as bare metal resources or as virtual machine instances 1318a-d and (which may be referred herein singularly as virtual machine instance 1318 or in the plural as virtual machine instances 1318). The availability of virtualization technologies for computing hardware has provided benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 13, communications network 1330 may, for example, be a publicly accessible network of linked networks and possibly operated by various distinct parties, such as the Internet. In other embodiments, communications network 1330 may be a private network, such as, a corporate or university network that is wholly or partially inaccessible to non-privileged users. In still other embodiments, communications network 1330 may include one or more private networks with access to and/or from the Internet.

Communications network 1330 may provide access to computers 1302. User computers 1302 may be computers utilized by users 1300 or other customers of data center 1310. For instance, user computer 1302a or 1302b may be a server, a desktop or laptop personal computer, a tablet computer, a wireless telephone, a personal digital assistant (PDA), an e-book reader, a game console, a set-top box or any other computing device capable of accessing data center 1310. User computer 1302a or 1302b may connect directly to the Internet (e.g., via a cable modem or a Digital Subscriber Line (DSL)). Although only two user computers 1302a and 1302b are depicted, it should be appreciated that there may be multiple user computers.

User computers 1302 may also be utilized to configure aspects of the computing resources provided by data center 1310. In this regard, data center 1310 might provide a gateway or web interface through which aspects of its operation may be configured through the use of a web browser application program executing on user computer 1302. Alternately, a stand-alone application program executing on user computer 1302 might access an application programming interface (API) exposed by data center 1310 for performing the configuration operations. Other mechanisms for configuring the operation of various web services available at data center 1310 might also be utilized.

Servers 1316 shown in FIG. 13 may be standard servers configured appropriately for providing the computing resources described above and may provide computing resources for executing one or more web services and/or applications. In one embodiment, the computing resources may be virtual machine instances 1318. In the example of virtual machine instances, each of the servers 1316 may be configured to execute an instance manager 1320a or 1320b (which may be referred herein singularly as instance manager 1320 or in the plural as instance managers 1320) capable of executing the virtual machine instances 1318. The instance managers 1320 may be a virtual machine monitor (VMM) or another type of program configured to enable the execution of virtual machine instances 1318 on server 1316, for example. As discussed above, each of the virtual machine instances 1318 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 1310 shown in FIG. 13, a router 1314 may be utilized to interconnect the servers 1316a and 1316b. Router 1314 may also be connected to gateway 1340, which is connected to communications network 1330. Router 1314 may be connected to one or more load balancers, and alone or in combination may manage communications within networks in data center 1310, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 13 has been greatly simplified and that many more networks and networking devices may be utilized to interconnect the various computing systems disclosed herein. These network topologies and devices should be apparent to those skilled in the art.

It should also be appreciated that data center 1310 described in FIG. 13 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 14:
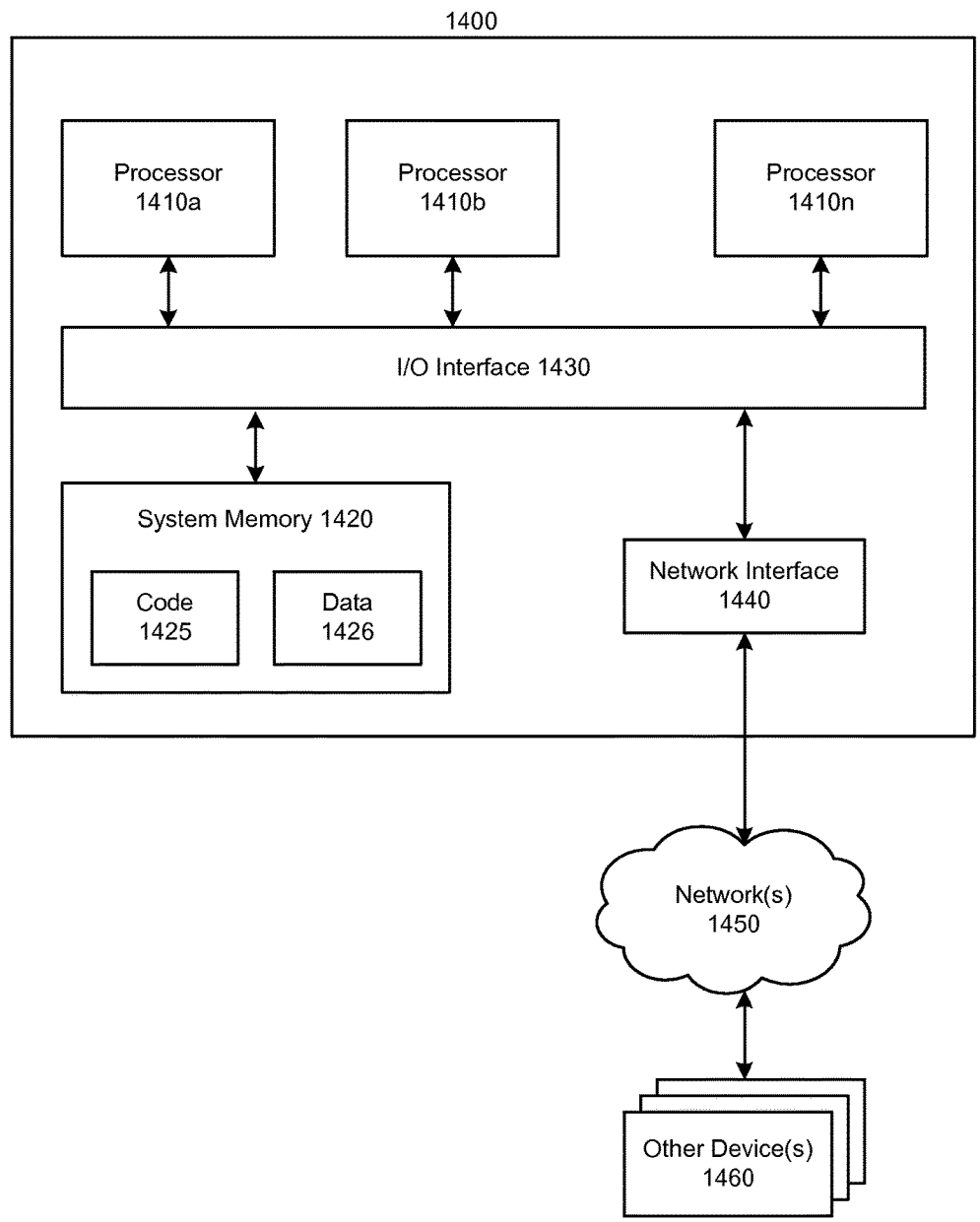
FIG. 14 depicts a diagram illustrating an example computing system that may be used in some embodiments.

In at least some embodiments, a server that implements a portion or all of one or more of the technologies described herein may include a general-purpose computer system that includes or is configured to access one or more computer-accessible media. FIG. 14 depicts a general-purpose computer system that includes or is configured to access one or more computer-accessible media. In the illustrated embodiment, computing device 1400 includes one or more processors 1410*a*, 1410*b* and/or 1410*n* (which may be referred herein singularly as "a processor 1410" or in the plural as "the processors 1410") coupled to a system memory 1420 via an input/output (I/O) interface 1430. Computing device 1400 further includes a network interface 1440 coupled to I/O interface 1430.

In various embodiments, computing device 1400 may be a uniprocessor system including one processor 1410 or a multiprocessor system including several processors 1410 (e.g., two, four, eight or another suitable number). Processors 1410 may be any suitable processors capable of executing instructions. For example, in various embodiments, processors 1410 may be general-purpose or embedded processors implementing any of a variety of instruction set architectures (ISAs), such as the x86, PowerPC, SPARC or MIPS ISAs or any other suitable ISA. In multiprocessor systems, each of processors 1410 may commonly, but not necessarily, implement the same ISA.

System memory 1420 may be configured to store instructions and data accessible by processor(s) 1410. In various embodiments, system memory 1420 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 1420 as code 1425 and data 1426.

In one embodiment, I/O interface 1430 may be configured to coordinate I/O traffic between processor 1410, system memory 1420 and any peripherals in the device, including network interface 1440 or other peripheral interfaces. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computing device 1400 and other device or devices 1460 attached to a network or networks 1450, such as other computer systems or devices, for example. In various embodiments, network interface 1440 may support communication via any suitable wired or wireless general data networks, such as types of Ethernet networks, for example. Additionally, network interface 1440 may support communication via telecommunications/telephony networks, such as analog voice networks or digital fiber communications networks, via storage area networks, such as Fibre Channel SANs (storage area networks) or via any other suitable type of network and/or protocol.

In some embodiments, system memory 1420 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1400 via I/O interface 1430. A non-transitory computer-accessible storage medium may also include any volatile or non-volatile media, such as RAM (e.g. SDRAM, DDR SDRAM, RDRAM, SRAM, etc.), ROM etc., that may be included in some embodiments of computing device 1400 as system memory 1420 or another type of memory. Further, a computer-accessible medium may include transmission media or signals, such as electrical, electromagnetic or digital signals, conveyed via a communication medium, such as a network and/or a wireless link, such as those that may be implemented via network interface 1440. Portions or all of multiple computing devices, such as those illustrated in FIG. 14, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity, such as a company or a public sector organization to provide one or more web services (such as various types of cloud-based computing or storage), accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Thus, as set forth above, a content provider may provide content to a destination over a network, such as the Internet, using, for example, streaming content delivery techniques. A content provider may, for example, provide a content delivery service that may reside on one or more servers. The service may be scalable to meet the demands of one or more customers and may increase or decrease in capability based on the number and type of incoming client requests. The content delivery service may, in some cases, process a content item in parallel across multiple nodes of the content delivery service. This may be done, in one embodiment, to reduce the latency for rendering the content item. Portions of the content delivery service may also be migrated to be placed in a position of reduced latency with a requesting client. In some cases, the content provider may determine an "edge" of a system or network associated with the content provider that is physically and/or logically closest to a requesting client. The content provider may then, for example, "spin-up," migrate resources or otherwise employ components associated with the determined edge for interacting with requests from the client. Such an edge determination process may, in some cases, provide an efficient technique for identifying and employing components that are well suited to interact with a particular client, and may, in some embodiments, reduce the latency for communications between a content provider and one or more clients.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
   a first user account having associated therewith an identifier of a first touchscreen input device;
   a second user account having associated therewith an identifier of a second touchscreen input device;
   at least one processor; and
   one or more memories comprising instructions that, when executed by the at least one processor at least cause the computing system to:
   receive, from a first computing device, the identifier of the first touchscreen input device and a request to make an item of content from the first user account available to the second user account,
   associating the item of content from the first user account with the second user account,
   receiving, from a second computing device, the identifier of the second touchscreen input device, and
   transmitting the item of content to the second computing device.

2. The computing system of claim 1, wherein the first computing device is configured to send the identifier of the first touchscreen input device to the computing system in response to receiving the identifier of the first touchscreen input device from the first touchscreen input device.

3. The computing system of claim 2, wherein the first computing device is configured to receive the identifier of the first touchscreen input device from the first touchscreen input device via a wireless signal.

4. The computing system of claim 1, wherein the content comprises one or more of a music item, a file, an application, or text.

5. A method comprising:
   receiving, from a second computing device, by a computing system comprising a first account and a second account, an identifier of a first stylus and a request to make content in the first account accessible to the second account, wherein the first account is associated with the identifier of the first stylus;
   associating, by the computing system, the content with the second account;
   receiving, by the computing system from a first computing device, an identifier of a second stylus wherein the first computing device is configured to send the identifier of the second stylus to the computing device in response to receiving the identifier of the first stylus from the first stylus, and wherein the second account is associated with the identifier of the second stylus;
   sending, by the computing system, the content to the first computing device; and
   receiving, by the computing system, the content from the second computing device.

6. The method of claim 5, wherein receiving the identifier of the first stylus by the computing system comprises receiving the identifier of the first stylus by the computing system from the second computing device.

7. The method of claim 5, wherein the content is stored in the computing system before receiving the request to make the content in the first account accessible to the second account.

8. The method of claim 5, wherein the first computing device is configured to receive the identifier of the first stylus from the first stylus via a wireless signal.

9. The method of claim 8, wherein the wireless signal comprises one or more of a Bluetooth signal, a WiFi signal, an near field communication (NFC) signal, or a radio frequency identification (RFID) signal.

10. The method of claim 5, wherein the request to make the content in the first account accessible to the second account comprises an indication of the second account.

11. The method of claim 5, wherein the request to make the content in the first account accessible to the second account comprises an indication of a user associated with the second account.

12. The method of claim 5, further comprising:
verifying, by the computing system, the identifier of the first stylus before associating the content with the second account.

13. The method of claim 12, wherein verifying the identity of the stylus comprises receiving a particular code with the identifier of the first stylus.

14. The method of claim 5, wherein receiving the identifier of the first stylus by the computing system comprises receiving the identifier of the first stylus by the computing system from a second computing device, the method further comprising:
receiving, by the computing system from the second computing device, an indication that the identifier of the first stylus has been verified by the second computing device before associating the content with the second account.

15. The method as recited in claim 5, wherein the content comprises one or more of a music item, a file, an application, or text.

16. A non-transitory computer-readable medium having stored thereon computer-readable instructions, the computer-readable instructions comprising instructions that, when executed by a computing system, at least cause:
receiving, by the computing system, from a second computing device, a request to make content accessible to a user, the request comprising an identifier of a first touchscreen input device;
determining, by the computing system, that the content is associated with a first account and that the identifier of the first touchscreen input device is associated with the first account;
determining, by the computing system, a second account based at least in part on an association of the user with the second account;
associating, by the computing system, the content with the second account;
receiving, from a first computing device, an identifier of a second touchscreen input device wherein the first computing device is configured to send the identifier of the second stylus to the computing device in response to receiving the identifier of the first stylus from the first stylus;
determining, by the computing system, that the second touchscreen input device is associated with the second account;
sending the content to the first computing device; and
receiving the content from the second computing device.

17. The non-transitory computer-readable medium of claim 16, wherein the content is accessible to the computing system before receiving the request to share the content.

18. The non-transitory computer-readable medium of claim 16, the computer-readable instructions further comprising instructions that, when executed by the computing system, at least cause:
storing the content received from the second computing device and associating the content with the first account.

19. The non-transitory computer-readable medium of claim 16, wherein the content comprises one or more of a music item, a file, an application, or text.

20. The non-transitory computer-readable medium of claim 16, wherein the second computing device is configured to send the identifier of the first touchscreen input device to the computing system in response to receiving the identifier of the first touchscreen input device from the first touchscreen input device.

21. The non-transitory computer-readable medium of claim 20, wherein the second computing device is configured to receive the identifier of the first touchscreen input device from the first touchscreen input device via a wireless signal.

22. The non-transitory computer-readable medium of claim 16, wherein the content comprises one or more of a music item, a file, an application, or text.

* * * * *